US011187790B2

(12) United States Patent
Kuroda

(10) Patent No.: US 11,187,790 B2
(45) Date of Patent: Nov. 30, 2021

(54) LASER SCANNING SYSTEM, LASER SCANNING METHOD, MOVABLE LASER SCANNING SYSTEM, AND PROGRAM

(71) Applicant: Meiji University, Tokyo (JP)

(72) Inventor: Yoji Kuroda, Tokyo (JP)

(73) Assignee: Meiji University, Tokyo (JP)

( * ) Notice: Subject to any disclaimer, the term of this patent is extended or adjusted under 35 U.S.C. 154(b) by 589 days.

(21) Appl. No.: 16/071,551

(22) PCT Filed: Jan. 16, 2017

(86) PCT No.: PCT/JP2017/001229
§ 371 (c)(1),
(2) Date: Jul. 20, 2018

(87) PCT Pub. No.: WO2017/130770
PCT Pub. Date: Aug. 3, 2017

(65) Prior Publication Data
US 2019/0025411 A1   Jan. 24, 2019

(30) Foreign Application Priority Data

Jan. 29, 2016   (JP) .............................. JP2016-016353

(51) Int. Cl.
*G01C 3/08* (2006.01)
*G01S 7/481* (2006.01)
(Continued)

(52) U.S. Cl.
CPC .......... *G01S 7/4817* (2013.01); *G01B 11/002* (2013.01); *G01S 7/481* (2013.01);
(Continued)

(58) Field of Classification Search
CPC ...... G01S 7/4817; G02B 26/10; G01B 11/002
See application file for complete search history.

(56) References Cited

U.S. PATENT DOCUMENTS 9,043,069 B1    5/2015  Ferguson et al.
9,983,590 B2 *  5/2018  Templeton .............. G01S 17/86
(Continued)

FOREIGN PATENT DOCUMENTS

CN    101419335 A    4/2009
CN    102971657 A    3/2013
(Continued)

OTHER PUBLICATIONS

PCT Office, International Search Report issued in PCT/JP2017/001229 dated Apr. 11, 2017, 6 pages.
(Continued)

*Primary Examiner* — Mark Hellner
(74) *Attorney, Agent, or Firm* — Wood Herron & Evans LLP

(57) ABSTRACT

A laser scanning system of the present invention includes a first rotation mechanism configured to perform a rotation in a predetermined first rotation axis and at a rotation speed around the first rotation axis as a rotation center; a first rotation speed control unit configured to control the rotation speed of the rotation in the first rotation axis by the first rotation mechanism, and a laser scanner device disposed on the first rotation mechanism, to be rotated together with and by the first rotation mechanism, and the laser scanner device including a laser distance measuring unit configured to emit a leaser and to measure a distance to a detection target, wherein the first rotation speed control unit is configured to make a control to the rotation speed of the rotation in the first rotation axis in a detection rotation angle range corresponding to an area in which the detection target is present and another control to the rotation speed of the rotation in the first rotation axis in a non-detection rotation angle range corresponding to another area in which the detection target is not present.

21 Claims, 15 Drawing Sheets

(51) Int. Cl.
  *G01S 17/89* (2020.01)
  *G02B 26/10* (2006.01)
  *G01B 11/00* (2006.01)
  *G01S 7/48* (2006.01)

(52) U.S. Cl.
  CPC ............ *G01S 7/4808* (2013.01); *G01S 17/89* (2013.01); *G02B 26/10* (2013.01)

(56) References Cited

U.S. PATENT DOCUMENTS

| | | |
|---|---|---|
| 2007/0219720 A1 | 9/2007 | Trepagnier et al. |
| 2009/0168132 A1 | 7/2009 | Miyatake |
| 2010/0053593 A1 | 3/2010 | Bedros et al. |
| 2013/0054187 A1 | 2/2013 | Pochiraju et al. |
| 2014/0078519 A1 | 3/2014 | Steffey et al. |
| 2014/0111812 A1* | 4/2014 | Baeg ................ G01S 7/4814 356/610 |
| 2014/0233790 A1 | 8/2014 | Chen et al. |

FOREIGN PATENT DOCUMENTS

| | | |
|---|---|---|
| CN | 103196385 A | 7/2013 |
| CN | 105143820 A | 12/2015 |
| JP | H07325154 A | 12/1995 |
| JP | 2001147269 A | 5/2001 |
| JP | 2002098765 A | 4/2002 |
| JP | 2003329453 A | 11/2003 |
| JP | 2005128722 A | 5/2005 |
| JP | 2008186375 A | 8/2008 |
| JP | 2011196749 A | 10/2011 |
| JP | 02012002642 A * | 1/2012 ............ G01B 11/24 |
| JP | 2012052838 A | 3/2012 |
| JP | 5107928 B2 | 12/2012 |
| JP | 2013078978 A | 5/2013 |
| JP | 2015081921 A | 4/2015 |
| JP | 2015206796 A | 11/2015 |
| JP | 2015535337 A | 12/2015 |
| KR | 101449931 B1 | 10/2014 |
| KR | 1020160078043 A | 7/2016 |
| KR | 1020160084084 A | 7/2016 |
| TW | 201329509 A | 7/2013 |
| WO | 2015041689 A1 | 3/2015 |

OTHER PUBLICATIONS

Japanese Patent Office, Office Action issued in JP 2017-554531 dated Nov. 21, 2017, 15 pages.
European Patent Office, Search Report issued in EP 17744001.3 dated Oct. 22, 2019, 6 pages.
Taiwan Patent Office, Office Action issued in TW 106101425 dated Apr. 14, 2020, 14 pages.
Korean Patent Office, Notice of Allowance issued in KR 10-2018-7021417 dated Jul. 13, 2020.
Taiwan Patent Office, Office Action issued in TW 109135752 dated Aug. 5, 2021.

* cited by examiner

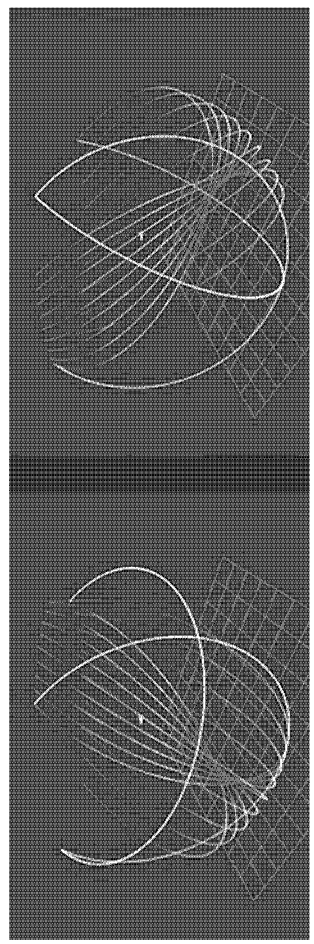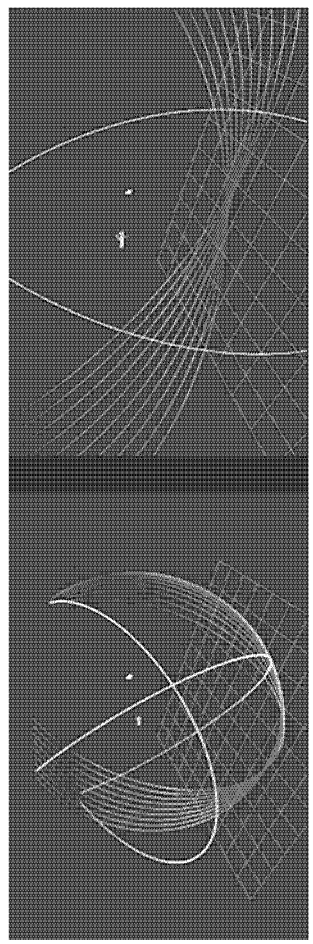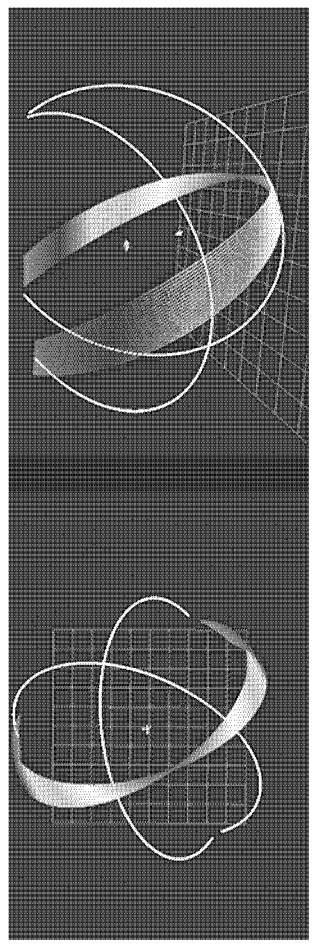
FIG. 8 (a) 1.0 Hz (b) 0.5 Hz (c) 0.1 Hz

LASER SCANNING SYSTEM, LASER SCANNING METHOD, MOVABLE LASER SCANNING SYSTEM, AND PROGRAM

TECHNICAL FIELD

The present invention relates to a laser scanning system, a laser scanning method, a movable laser scanning system, and a program.

Priority is claimed on Japanese Patent Application No. 2016-016353, filed on Jan. 29, 2016, the content of which is incorporated herein by reference.

BACKGROUND ART

Conventionally, for the purpose of detecting an obstacle by scanning the side in front using a laser, laser scanning devices detecting a position and a shape of an obstacle by receiving reflected light acquired by causing emitted laser pulses to be reflected by the obstacle are used (for example, see Patent Literature 1).

In order to estimate a shape of an obstacle with high accuracy when detecting the obstacle, it is necessary to increase a density of reflection points (spatial light positions) acquired through scanning, in other words, a radiant density of laser pulses per unit area in the obstacle.

CITATION LIST

Patent Literature

[Patent Literature 1]
Japanese Unexamined Patent Application, First Publication No. 2005-128722

SUMMARY OF INVENTION

Technical Problem

However, in a laser scanning system disclosed in Patent Literature 1 and the like, in order to increase the radiant density of laser pulses per unit area in the whole emission range, it is necessary to use a device including a laser scanner emitting more laser pulses.

For this reason, in a case in which the accuracy of detection of an obstacle (detection target object) is to be improved, the size of the laser scanning system is increased, and the price thereof increases.

The present invention takes into account such a situation, and an object thereof is to provide a laser scanning system, a laser scanning method, a movable laser scanning system, and a program preventing an increase in size and price of a laser scanning system and improving the accuracy of detection of a detection target object without increasing the number of laser scanners.

Solution to Problem

The present invention is formed for solving the problems described above, and, according to the present invention, there is provided a laser scanning system including: a first rotation mechanism configured to perform a rotation in a predetermined first rotation axis and at a rotation speed around the first rotation axis as a rotation center; a first rotation speed control unit configured to control the rotation speed of the rotation in the first rotation axis by the first rotation mechanism; and a laser scanner device disposed on the first rotation mechanism, to be rotated together with and by the first rotation mechanism, and the laser scanner device including a laser distance measuring unit configured to emit a leaser and to measure a distance to a detection target, wherein the first rotation speed control unit is configured to make a control to the rotation speed of the rotation in the first rotation axis in a detection rotation angle range corresponding to an area in which the detection target is present and another control to the rotation speed of the rotation in the first rotation axis in a non-detection rotation angle range corresponding to another area in which the detection target is not present.

The laser scanning system according to the present invention further includes a detection target detecting unit configured to detect the area in which the detection target is present.

The laser scanning system according to the present invention further includes a rotation angle range selecting unit configured to define the detection rotation angle range representing a range of a rotation angle of the first rotation mechanism in which the detection target is detected by the detection target detecting unit and define the non-detection rotation angle range representing a range of the rotation angle of the first rotation mechanism in which the detection target is not detected.

The laser scanning system according to the present invention further includes a target object extracting unit configured to extract a range of the rotation angle of the first rotation mechanism in which the detection target corresponding to an extraction condition set in advance is detected as the detection rotation angle range.

The laser scanning system according to the present invention further includes a rotation angle range estimating unit configured to estimate the detection rotation angle range representing a range of the rotation angle of the first rotation mechanism in which the detection target corresponding to the extraction condition is present and the non-detection rotation angle range representing a range of the rotation angle of the first rotation mechanism in which the detection target is not present, on the basis of a relative position and a relative speed between the detection target and the laser scanning system.

In the laser scanning system according to the present invention, the first rotation speed control unit is configured to make the first rotation axis rotation speed in the detection rotation angle range lower than the first rotation axis rotation speed in the non-detection rotation angle range.

In the laser scanning system according to the present invention, the laser scanner includes a mechanism configured to change, for scanning, a radiation direction of the laser emitted toward a predetermined scanning face.

In the laser scanning system according to the present invention, the laser scanner includes a digital mirror device configured to scan the laser in the radiation direction.

In the laser scanning system according to the present invention, the laser scanner includes a second rotation mechanism configured to rotate the laser distance measuring unit at a second rotation axis rotation speed around a second rotation axis which is defined to be a straight axis which has a predetermined angle with respect to the first rotation axis, wherein the laser distance measuring unit is configured to emit a laser in a predetermined angular direction with respect to the second rotation axis.

In the laser scanning system according to the present invention, the angle defined between the first rotation axis and the second rotation axis is more than 0 degree and less than 180 degrees.

The laser scanning system according to the present invention further includes a second rotation speed control unit is configured to control the second rotation axis rotation speeds in the detection rotation angle range and the non-detection rotation angle range.

In the laser scanning system according to the present invention, the first rotation mechanism includes n laser scanners at n positions which are symmetrical with respect to the rotation of the first rotation axis.

According to the present invention, there is provided a movable laser scanning system having the laser scanning system mounted on a movable body.

According to the present invention, there is provided a laser scanning method comprising:

a first rotation speed control process of controlling, by a first rotation speed control unit, a rotation speed in a first rotation axis of a first rotation mechanism configured to perform a rotation in the first rotation axis and at the rotation speed around the first rotation axis as a rotation center; and a laser scanner device operating process of measuring a distance to a detection target with a laser irradiation made by a laser scanner, wherein the laser scanner is provided on the first rotation mechanism and is rotatable together with the first rotation mechanism wherein the first rotation speed control process comprises controlling a first rotation speed, by a first rotation speed control unit, in each of a detection rotation angle range corresponding to an area in which the detection target is present and a non-detection rotation angle range corresponding to another area in which the detection target is not present.

According to the present invention, there is provided a program causing a computer to act as: a first rotation speed control function of controlling, by a first rotation speed control unit, a rotation speed in a first rotation axis of a first rotation mechanism configured to perform a rotation in the first rotation axis and at the rotation speed around the first rotation axis as a rotation center; and a laser scanner device operation function of measuring a distance to a detection target with a laser irradiation made by a laser scanner, wherein the laser scanner is provided on the first rotation mechanism and is rotatable together with the first rotation mechanism wherein the first rotation speed control function comprises controlling a first rotation speed, by a first rotation speed control unit, in each of a detection rotation angle range corresponding to an area in which the detection target is present and a non-detection rotation angle range corresponding to another area in which the detection target is not present.

Advantageous Effects of Invention

According to the present invention, a laser scanning system, a laser scanning method, and a program can be provided in which increase in size of the system, the degree of complexity of circuits, and the price can be prevented along with improvement in accuracy of detection of a detection target object without increasing the number of laser scanners.

BRIEF DESCRIPTION OF DRAWINGS

FIG. 8 is a diagram illustrating a radiant density of a laser pulse changing in accordance with a rotation speed of a rotary table.

DESCRIPTION OF EMBODIMENTS

In the present invention, in a direction in which a detection target object is detected, a high-density radiation angle range in which a laser is to be emitted with a high density is selected, a density with which the laser is emitted in the high-density radiation angle range is increased such that it is higher than that in another range, and thereby the accuracy of detection of the detection target object is improved.

First Embodiment

Figure 1:
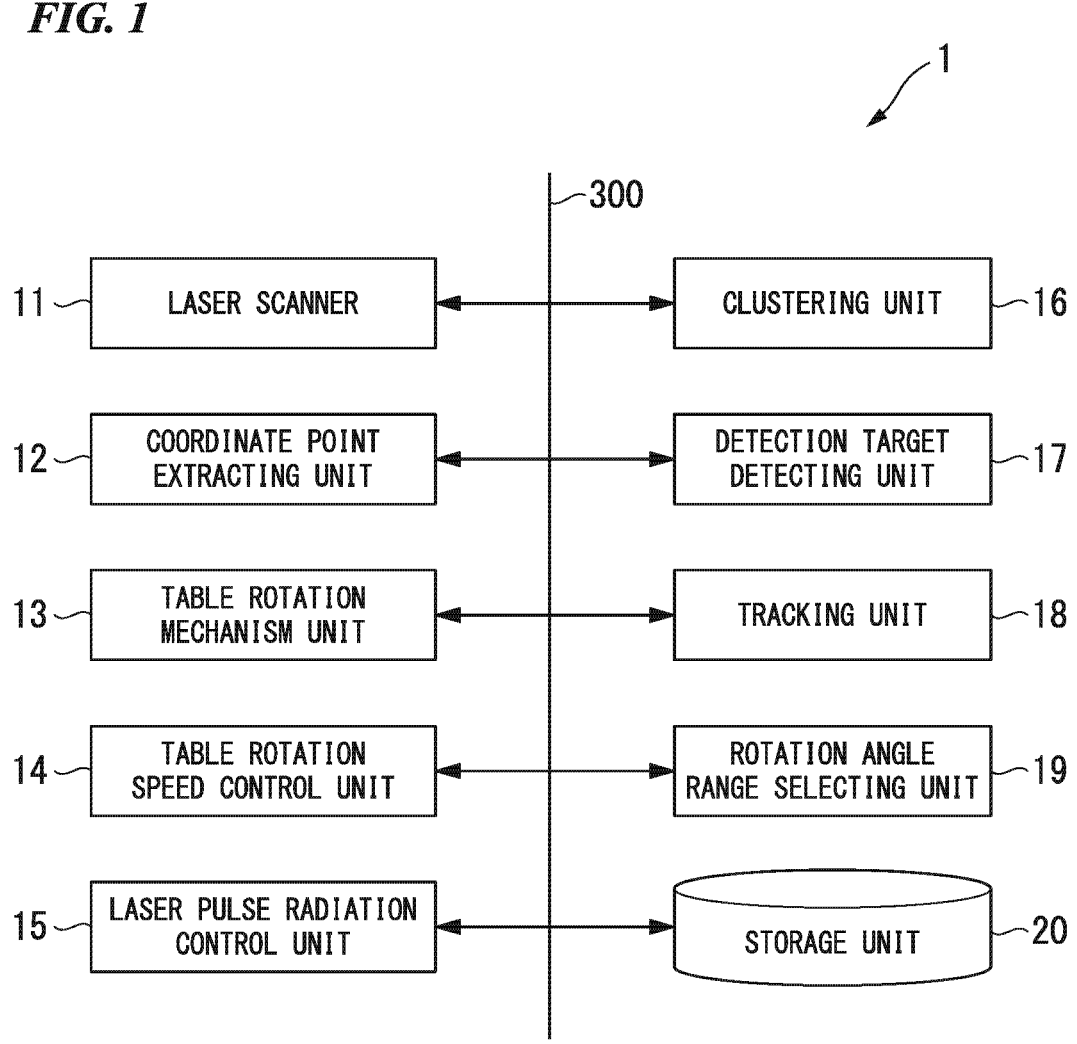
FIG. 1 is a diagram illustrating an example of the configuration of a laser scanning system according to a first embodiment.

FIG. 1 is a diagram illustrating an example of the configuration of a laser scanning system 1 according to a first embodiment of the present invention. The laser scanning system according to the first embodiment includes: a laser scanner 11; a coordinate point extracting unit 12; a table rotation mechanism unit 13; a table rotation speed control unit 14; a laser pulse radiation control unit 15; a clustering unit 16; a detection target detecting unit 17; a tracking unit 18; a rotation angle range selecting unit 19; and a storage unit 20. In addition, a data bus 300 is a data bus through which data and control signals are delivered between the laser scanner 11, the coordinate point extracting unit 12, the table rotation mechanism unit 13, the table rotation speed control unit 14, the laser pulse radiation control unit 15, the clustering unit 16, the detection target detecting unit 17, the tracking unit 18, the rotation angle range selecting unit 19, and the storage unit 20.

Figure 6:
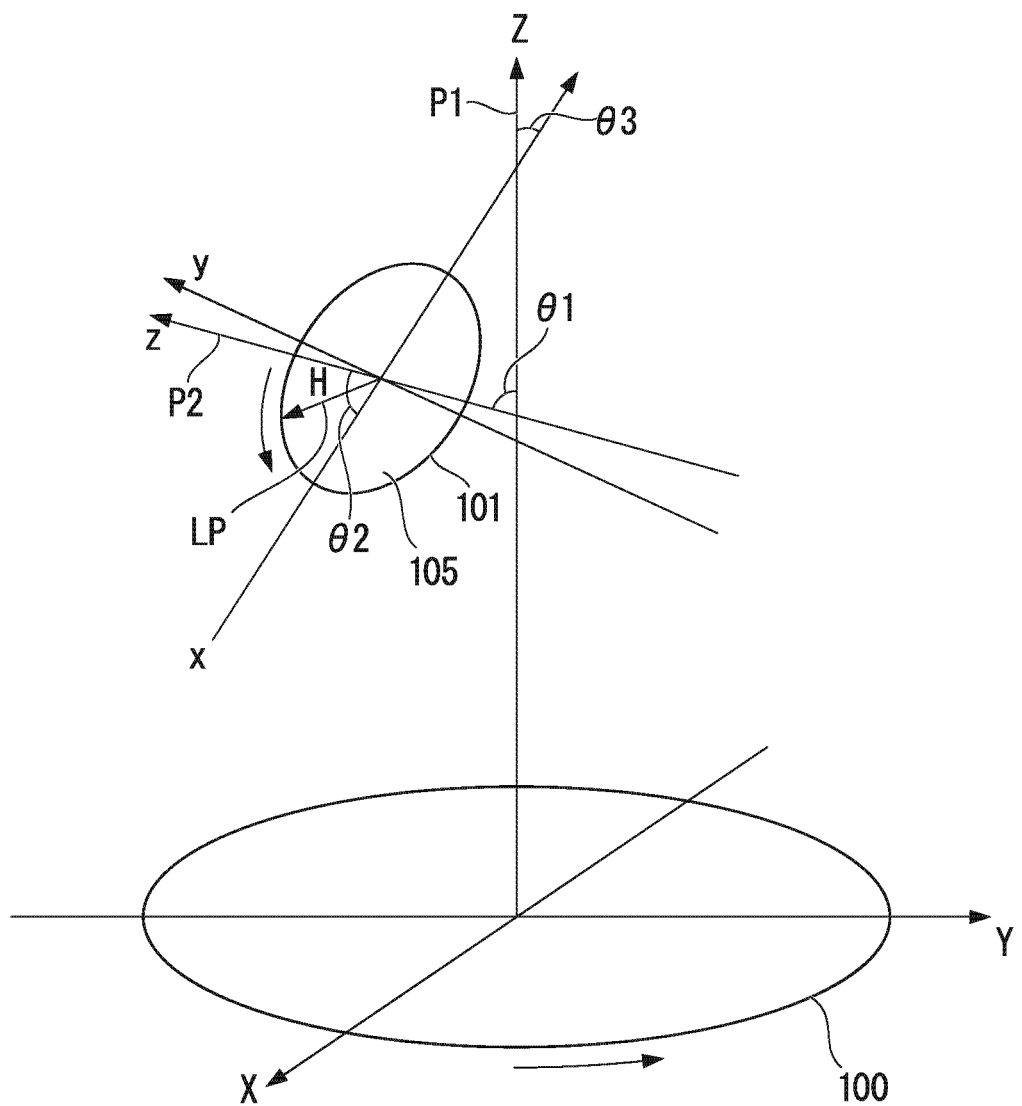
FIG. 6 is a diagram illustrating a relation between the rotation of a rotary table and the radiation direction of a laser pulse of a laser scanner 11.

The laser scanner 11 includes a second rotation mechanism that performs a rotation of the radiation direction of a laser pulse around a second rotation axis as a rotation center while emitting the laser pulse at a predetermined second angle with respect to the second rotation axis (a second rotation axis P2 illustrated in FIG. 6) forming a predetermined first angle (an angle θ1 illustrated in FIG. 6) with a first rotation axis (a first rotation axis P1 illustrated in FIG. 6). Here, the first angle is an angle in an angle range that is over 0 degrees and is less than 180 degrees. The second angle is more than 0 degrees and is equal to or less than 90 degrees and, for example, is an angle θ2 illustrated in FIG. 6.

In the laser scanner 11, in this embodiment, a laser distance measuring unit (corresponding to the laser pulse radiation control unit 15 to be described later) is disposed. The laser distance measuring unit, for example, emits a laser pulse at a second angle (θ2=90 degrees) that is perpendicular to the second rotation axis and controls the radiation direction of the laser to be parallel to a plane perpendicular to the second rotation axis at a predetermined second rotation axis rotation speed, and periodically emits a laser pulse. In addition, the laser scanner 11 receives reflected light (including reflected light from a detection target object) from the emitted pulse laser. In this embodiment, although the second angle is described as being 90 degrees, as described above, the second angle may be any angle that is over 0 degrees and is 90 degrees or less.

The coordinate point extracting unit 12, in the detection space described above, detects position coordinates of each spatial light point in a detection space that is a three-dimensional space from information of a rotation angle of the rotary table, the radiation direction of the laser pulse in the laser scanner 11, and a measured distance acquired from a delay time until reflected light is incident after the emission thereof. In this embodiment, a three-dimensional space having the laser scanning system as its origin is set as the detection space described above. Here, a spatial light point represents a reflection point at which the emitted laser pulse is reflected and is represented using coordinate values in the detection space.

In addition, in this embodiment, a laser pulse emitted from a pulse laser of the laser scanner 11 will be described as one example. However, a laser emitted from the laser scanner 11 may not be a pulse oscillation and may be an ordinary continuous wave (CW) laser performing continuous oscillation. In other words, as the laser scanner 11 according to this embodiment, any scanner may be employed as long as a configuration is employed in which a CW laser is built in, and a process of measuring a distance from a radiation point at which the CW laser is emitted to a spatial light point at which the laser light is reflected can be performed.

The table rotation mechanism unit 13 includes a driving mechanism that rotates the rotary table and, for example, includes a rotation manipulator and rotates the rotary table around the first rotation axis as the rotation center at a predetermined first rotation axis rotation speed. In this embodiment, as the mechanism rotating the laser scanner 11, the rotary table is used. However, in this embodiment, as long as the laser scanner 11 can be rotated around a predetermined first rotation axis as its center, the laser scanner may be directly fixed to the first rotation axis using a fixture, or it may be configured such that a fixing base is attached for the first rotation axis, and a rotation mechanism disposed in the fixing base is used.

The table rotation speed control unit 14 (first rotation speed control unit) controls the table rotation mechanism unit 13 to control a first rotation axis rotation speed of the rotary table for each predetermined angle range.

The laser pulse radiation control unit 15 (second rotation speed control unit) controls a radiation direction of a laser pulse and a radiation period of the laser pulse in the laser scanner 11. In this embodiment, although the function of the laser pulse radiation control unit 15 is described as being separate from the laser scanner 11, the laser pulse radiation control unit 15 may be disposed inside the laser scanner 11.

The clustering unit 16 removes a group of spatial light points on the ground that are not necessary for the detection of a detection target in the detection space.

In addition, the clustering unit 16 removes spatial light points on the ground and performs clustering based on Euclid distances for a group of spatial light points representing a three-dimensional object that is stereoscopic. Here, the clustering unit 16 generates a cluster of various large and small three-dimensional objects such as a person, a wall face, a tree, and the like.

The detection target detecting unit 17 generates a bounding box for the cluster generated by the clustering unit 16 and extracts separate clusters in units of detection targets from the cluster (one group which is a group of spatial light points of a plurality of detection targets) using the bounding box. In addition, the detection target detecting unit 17 extracts a feature amount of a group of spatial light points of each separate cluster and classifies detection targets represented by groups of spatial light points of the separate clusters into persons and three-dimensional objects other than persons using the extracted feature amounts.

The tracking unit 18, for example, performs a prediction of a position of each of the clusters classified into persons at a predetermined time using a Kalman filter.

Then, the tracking unit 18 performs association between a predicted separate cluster predicted as above and a separate cluster that is newly observed, thereby performing a tracking process of each separate cluster. Here, the tracking unit 18, for example, performs association with a predicted separate cluster predicted using the degree of similarity for the newly-observed separate cluster using a Mahalanobis distance in consideration of a covariance matrix. The tracking unit 18 outputs coordinate information of the separate cluster that is a detection target in a three-dimensional space.

The rotation angle range selecting unit 19 defines a detection rotation angle range (the detection rotation angle range according to the first embodiment is a first detection rotation angle range) that is a rotation angle range of the rotary table in which a laser pulse is emitted to an area in which a detection target is detected using the coordinate information of the separate cluster that is the detection target supplied from the tracking unit 18 in the three-dimensional space. In addition, the rotation angle range selecting unit 19 defines the non-detection rotation angle range to be other than the detection rotation angle range. In the storage unit 20, a first rotation axis rotation speed for the detection rotation angle range and a first rotation axis rotation speed for the non-detection rotation angle range is written and stored in advance.

The table rotation speed control unit 14 reads the first rotation axis rotation speed for the detection rotation angle range and the first rotation axis rotation speed for the non-detection rotation angle range by referring to the storage unit 20. Then, the table rotation speed control unit 14 makes a control to a rotation speed of the rotation angle for each of the detection rotation angle range and the non-detection rotation angle range (for example, control of the amount of change in the rotation angle in a predetermined time) using the read first rotation axis rotation speed.

Figure 2:
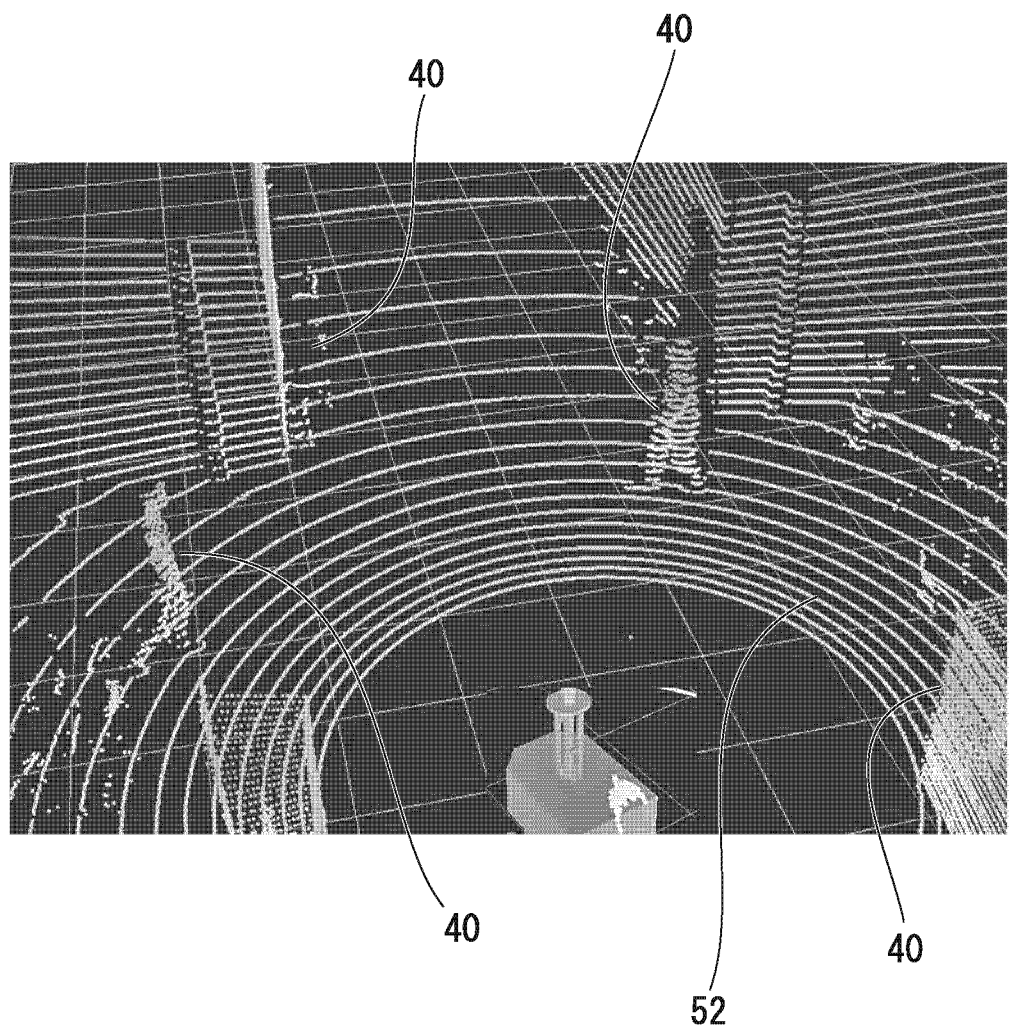
FIG. 2 is a diagram illustrating an extraction process of a coordinate point extracting unit 12 extracting coordinates of spatial light points corresponding to a detection target object in a three-dimensional space using a laser pulse emitted by a laser scanner 11.

FIG. 2 is a diagram illustrating an extraction process of the coordinate point extracting unit 12 extracting coordinates of spatial light points corresponding to a detection target object in a three-dimensional space using a laser pulse emitted by the laser scanner 11. The coordinate point extracting unit 12 extracts spatial light points corresponding to a detection target object in a three-dimensional space using reflected light of the laser pulse from a three-dimensional object 40 such as a building, a person, or the like that is the detection target object (a building 51, a person surrounded by a bounding box 50, or the like illustrated in FIG. 3) and the ground 52.

In addition, the clustering unit 16 performs a process of removing spatial light points (coordinate points of reflected light acquired by causing the laser pulse to be reflected on the ground) corresponding to the ground 52 that are unnecessary for the detection process of a three-dimensional object 40 that is a detection target object from point group information of the spatial light points extracted by the coordinate point extracting unit 12.

In other words, the clustering unit 16 projects a group of the acquired spatial light points onto a two-dimensional grid map and acquires a difference between a highest point and a lowest point of numerical values (z-axis coordinate values) of heights of spatial light points of each cell forming the grid map. Then, the clustering unit 16 determines that a detection target having a three-dimensional shape is not present in a cell of which the acquired difference is a threshold set in advance or less. Then, the clustering unit 16 removes spatial light points projected onto a cell in which a detection target having a three-dimensional shape is not present from the group of the points detected by the coordinate point extracting unit 12. In addition, in this embodiment, in order to remove also the spatial light points of the ground 52 in each cell in which a detection target having a three-dimensional shape is present, the inclination of connection lines (ring) connecting a point of interest and four nearby spatial light points adjacent thereto with respect to a two-dimensional plane is acquired. Then, in a case in which the inclination of the connection lines connected to the four spatial light points is a predetermined inclination or less, by removing the spatial light point of the point of interest, spatial light points corresponding to the ground 52 that are unnecessary for the detection process of a three-dimensional object 40 that is a detection target object are removed from the group of the acquired spatial light points.

Figure 3:
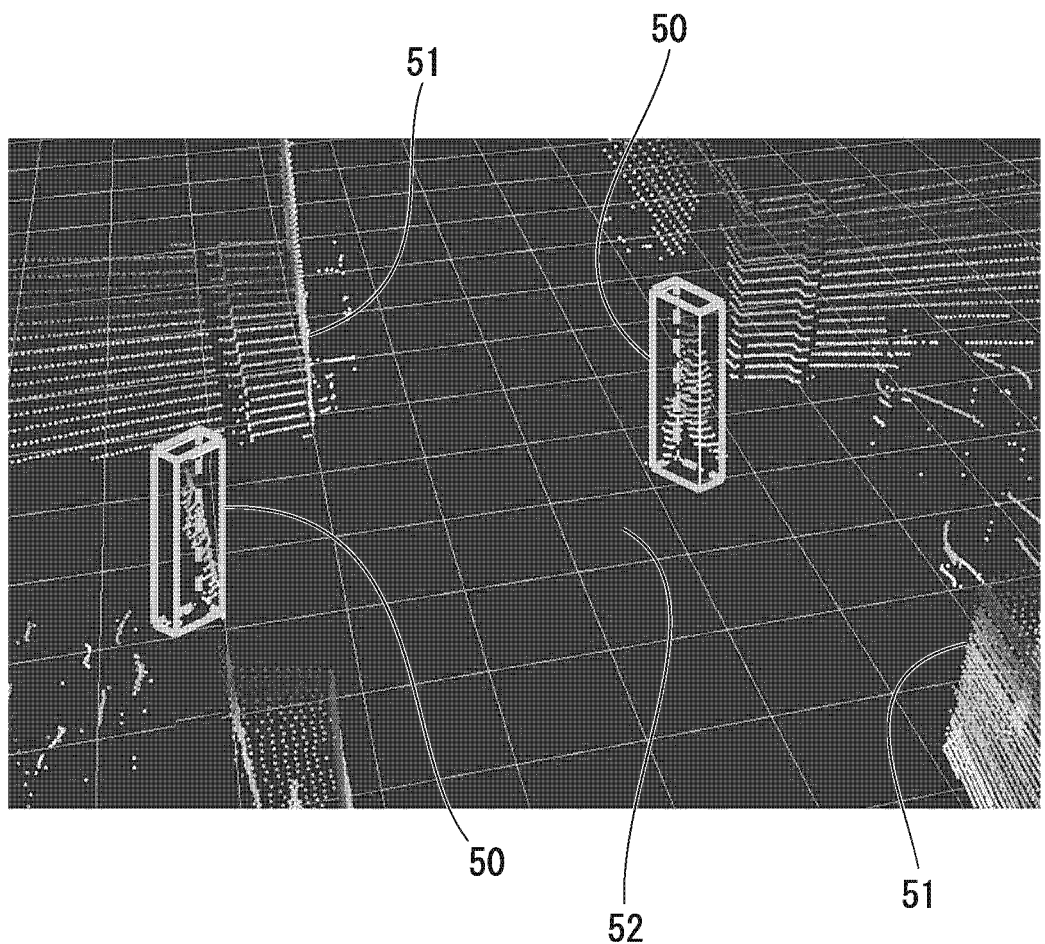
FIG. 3 is diagram illustrating a clustering process of spatial light points in a point group in which spatial light points corresponding to the ground are removed.

FIG. 3 is diagram illustrating a clustering process of spatial light points in a point group in which spatial light points corresponding to the ground (reference numeral 52) are removed. As described above, the clustering unit 16 performs a clustering process of spatial light points of each point group using a Euclid distance between spatial light points in a three-dimensional space in the point group of spatial light points representing a detection target object having a three-dimensional shape (a person surrounded by a bounding box 50 or a building 51). In the process described above, not only in a person but also in an environment such as a wall face or a tree, various large and small objects having three-dimensional shapes are included. In a case in which a distance between clusters is short such as a case in which a person is present near an object having a three-dimensional shape other than the person, a case in which a plurality of persons are walking in a row, or the like, the clustering unit 16 arranges the clusters as one composite cluster in which a plurality of the clusters are arranged as one group.

For this reason, in this embodiment, a cluster is separated by the clustering unit 16 using principal component analysis and a bounding box (for example, see reference numeral 50 illustrated in FIG. 3). For each generated cluster, the clustering unit 16 performs principal component analysis for dividing a composite cluster in which a plurality clusters are arranged as one group into separate clusters in accordance with the same criteria. Through this principal component analysis, the clustering unit 16 can acquire principal components (principal component axes) by performing eigenvalue decomposition for a covariance matrix. The principal component axes, for example, are three axes in a direction of the height of a person, a thickness direction to the front/rear of a body of a person, and a horizontal width direction of a body of a person. The clustering unit 16 adjusts the directions of the main component axes by rotating each cluster on the basis of the calculated main component axes using a rotation matrix having a sensor origin as a reference, thereby generalizing each cluster. The sensor origin is a center point of a three-dimensional space in the laser scanning system.

For the cluster for which the main component analysis has been performed, by forming a bounding box, the size of the cluster is detected, and a division plane used for dividing a composite cluster into separate clusters is determined using a plane formed by the main component axes in the height direction of a person and the horizontal-width direction of the body of the person and the bounding box. Here, the bounding box is a boundary face including an object having a three-dimensional shape and is used for easily representing the height, the thickness, and the width of the object having a three-dimensional shape by regarding an area inside the boundary in the three-dimensional space as a rectangular box.

As described above, the clustering unit 16, by using the main component analysis and the bounding box, performs the process of clustering spatial light points of each point group acquired from the coordinate point extracting unit 12 and acquires separate clusters.

Figure 4:
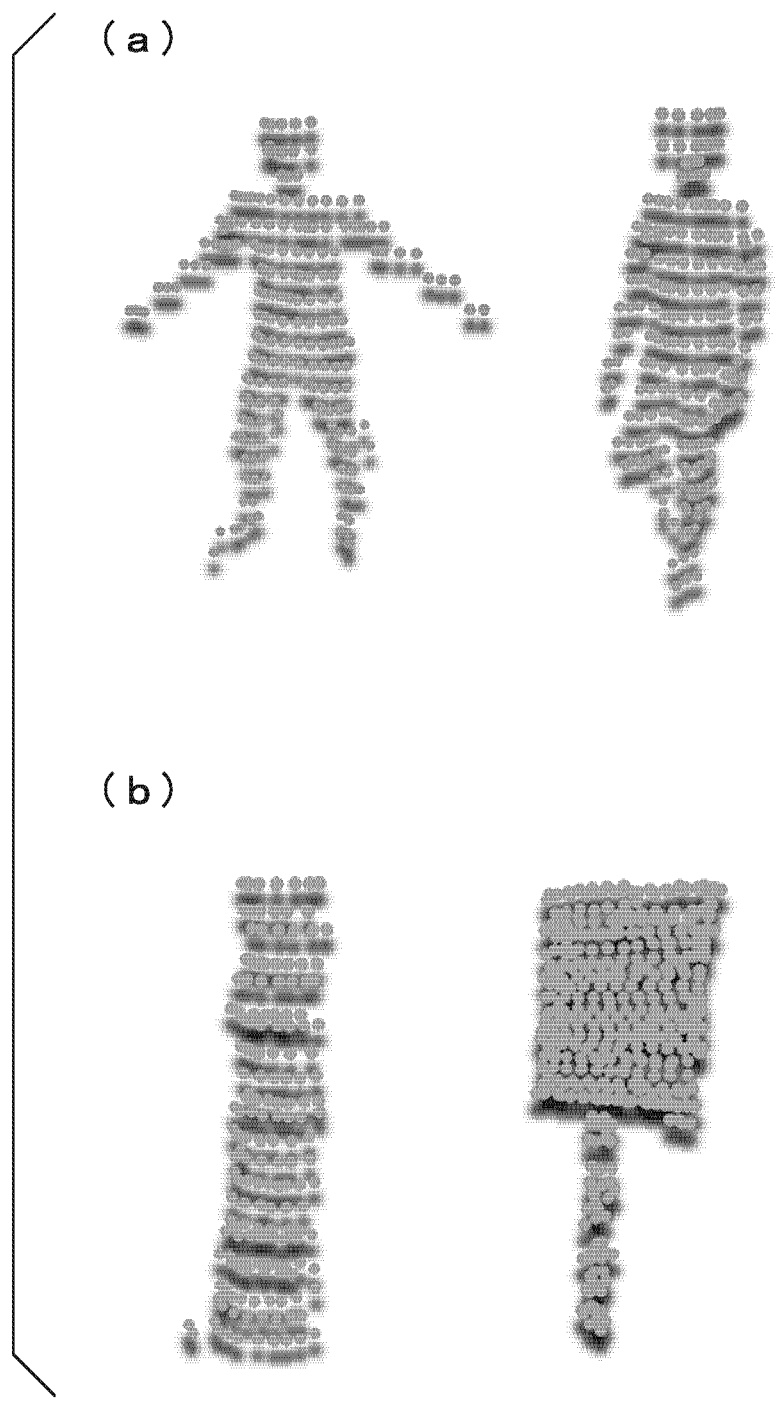
FIG. 4 is a diagram illustrating a process of a detection target detecting unit 17 performing classification of clusters from three-dimensional point groups of clusters by detecting feature amounts.

FIG. 4 is a diagram illustrating a process of the detection target detecting unit 17 performing classification of clusters from three-dimensional point groups of clusters by detecting feature amounts. FIG. 4(*a*) illustrates a three-dimensional point group of spatial light points representing a person in a cluster of a point group acquired from the coordinate point extracting unit 12.

FIG. 4(*b*) illustrates a three-dimensional point group of spatial light points representing an object having a three-dimensional shape other than a person in a separate cluster of a point group acquired from the coordinate point extracting unit 12.

While a person has various external appearance features such as a height, a color of clothes, and the like, the external appearance of the shape of a person is the same in any person, and there is no large difference between ordinary features of persons.

Accordingly, the detection target detecting unit 17 extracts shape information of a three-dimensional shape of each three-dimensional point group from the three-dimensional point group of the separate cluster as a feature amount. Then, the detection target detecting unit 17 extracts a separate cluster corresponding to a person from among separate clusters acquired by clustering point groups using the extracted feature amounts. The detection target detecting unit 17 performs learning using a support vector machine (SVM) using the feature amounts extracted from shape information of a person and the like that are detection targets to be detected in advance, thereby acquiring a reference feature amount of each detection target object as learning data. The detection target detecting unit 17 compares the extracted feature amount extracted from each three-dimensional point group with the reference feature amount and classifies the three-dimensional point group, for example, as human or the others on the basis of the degree of similarity between the extracted feature amount and the reference feature amount and the like.

Figure 5:
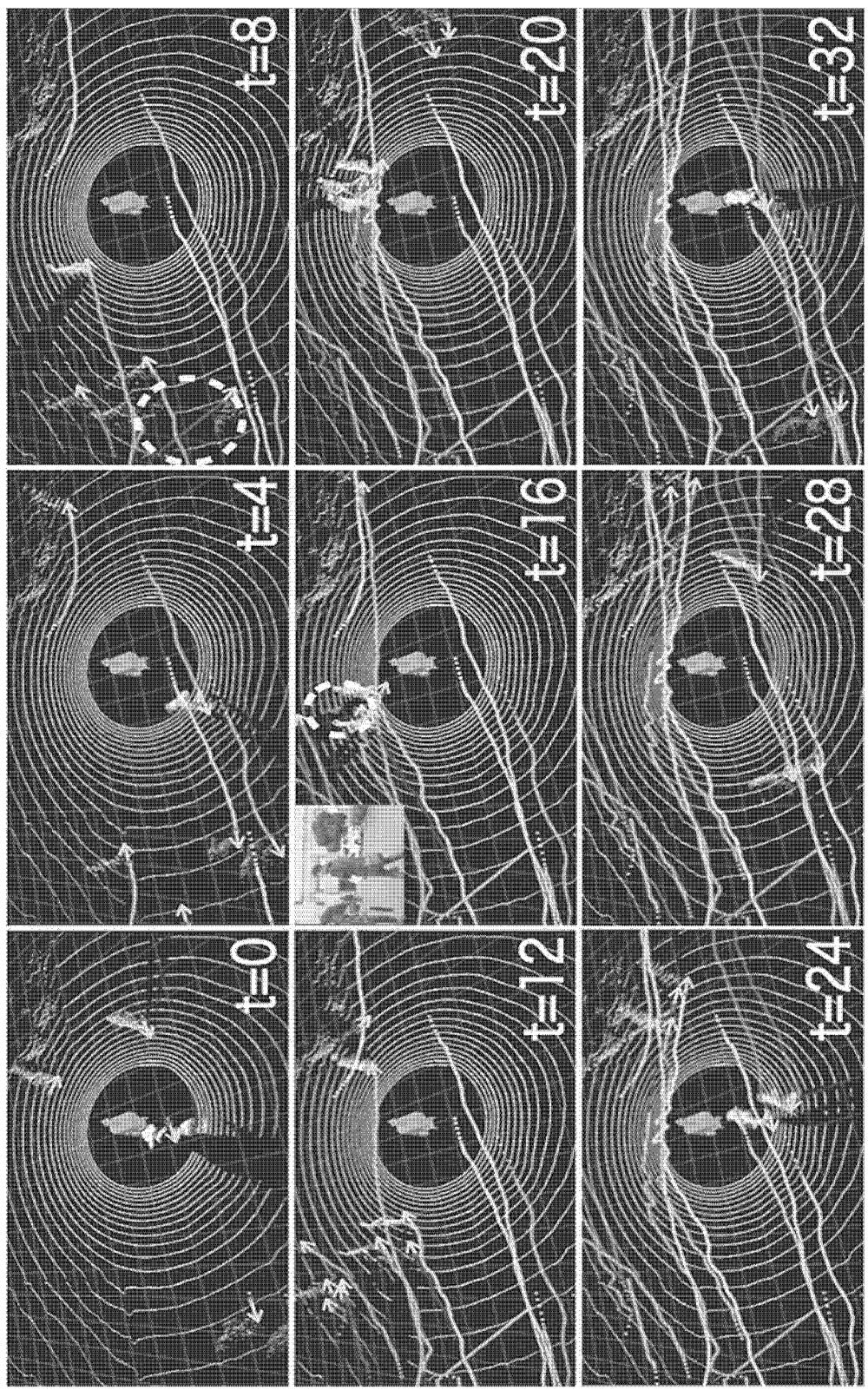
FIG. 5 is a diagram illustrating a tracking process of three-dimensional point groups of clusters performed by a tracking unit 18.

FIG. 5 is a diagram illustrating a tracking process of three-dimensional point groups of clusters performed by the tracking unit 18. The tracking unit 18, as described above, compares a predicted separate cluster predicted using a Kalman filter or the like and each separate cluster extracted from a point group that is newly measured and performs association of each separate cluster with a predicted separate cluster. In other words, in a space of a real world that is a detection target, in accordance with influences of occlusion generated according to the presence of obstacles and other persons, it is difficult to constantly acquire all the three-dimensional point groups of a separate cluster. For this reason, in order to stably detect a separate cluster as a person, the tracking unit 18 performs the tracking process described above. Accordingly, the tracking unit 18 associates separate clusters acquired at each of times and can acquire a movement track as the same separate cluster, in other words, a person as a separate cluster. In FIG. 5, a movement track of a person detected from time t=0 and to time t=32 (seconds) at an interval of four seconds is illustrated.

FIG. 6 is a diagram illustrating a relation between the rotation of the rotary table and the radiation direction of a laser pulse of the laser scanner 11. As described above, the table rotation speed control unit 14 controls (hereinafter, referred to as "revolves") a rotation speed of a rotation of the rotary table 100 such that the face of the rotary table is parallel to a two-dimensional plane formed by an X axis and a Y axis at a predetermined first rotation axis rotation speed with respect to the first rotation axis P1 (Z axis) by controlling the table rotation mechanism unit 13. Here, the X axis, the Y axis, and a Z axis are orthogonal to each other and form a three-dimensional space as a detection space in the laser scanning system according to this embodiment. In addition, the laser scanner 11 revolves around the first rotation axis P1 (hereinafter, referred to as "rotates") and rotates a radiation direction H in which a laser pulse LP is emitted at a predetermined second rotation axis rotation speed with respect to the second rotation axis P2 (z axis). An x axis, a y axis, and a z axis are orthogonal to each other and form a three-dimensional space representing the rotation of the radiation direction of the laser pulse LP.

In a two-dimensional plane 105, a circle 101 is formed by rotating the radiation direction H around the second rotation axis P2 as the rotation center. Here, the laser scanner 11 periodically changes the radiation direction of the laser pulse at a predetermined second rotation axis rotation speed (rotates the radiation direction around the second rotation axis as its center) such that the two-dimensional plane 105 in which the circle 101 is formed has a predetermined third angle θ3 with respect to the first rotation axis P1 of the rotary table 100. In this embodiment, the third angle θ3 is 30°. The radiation direction is a rotation angle of a rotation around the second rotation axis at which the laser pulse is emitted. The second rotation axis P2 is set to a first angle θ1, which forms the predetermined third angle θ3, with respect to the first rotation axis P1. In this case, for example, the second angle θ2 is set to 90 degrees.

As illustrated in FIG. 6, the table rotation speed control unit 14 controls a change in the rotation speed, for example, by setting an angle change differently in the detection rotation angle range and the non-detection rotation angle range. For example, in a case in which a rotation of n° per predetermined time is made in the detection rotation angle range, a rotation of α×n° in the non-detection angle range per the predetermined time may be made (α>1). Accordingly, the table rotation speed control unit 14 decreases the first rotation axis rotation speed in the detection rotation angle range of the rotary table and increases the first rotation axis rotation speed in the non-detection rotation angle range. Accordingly, in the detection rotation angle range, the radiant density of a laser pulse is increased. In the non-detection rotation angle range, the radiant density of the laser pulse is decreased.

Accordingly, in the detection rotation angle range, a density that is a times higher than the density in the non-detection rotation angle range. The laser scanner 11 makes one turn of the radiation direction H of the laser pulse LP along the circumference of the circle 101 every time a rotation of n° is made in the detection rotation angle range and every time a rotation of α×n° is made in the non-detection rotation angle range. In other words, every time an angle is changed by n° or α×n° in accordance with a stepping operation, the laser scanner 11 causes the radiation direction H of the laser pulse LP to make one turn along the circumference of the circle 101 at the changed angle.

In this embodiment, the rotation of the rotation direction of the laser pulse is performed by a rotation mechanism (second rotation mechanism) disposed inside the laser scanner 11. One configuration of this rotation mechanism is to change the radiation direction of the laser pulse by controlling the rotation of a laser head emitting the laser pulse around a second rotation axis as a center axis. In addition, as another configuration of the rotation function, a configuration may be employed in which the radiation direction of a laser pulse emitted from a laser head is changed by reflecting the laser pulse using a polygon mirror or a digital mirror device in a state in which the position of the laser head is fixed. Particularly, in a case in which the digital mirror device is used, the digital mirror device is a minute semiconductor device, and thus, the size of the laser scanner 11 can be decreased. In this digital mirror device, the radiation direction of a laser pulse emitted from a laser head is changed to scan a predetermined scanning range (scanning face) by adjusting the angle of a digital mirror. In addition, in a case in which the digital mirror device is used, a width change in the radiation direction is small, and thus, it is preferable to dispose a plurality of sets each including a laser and a digital mirror device. Accordingly, the scanning range of a laser pulse that is required can be adjusted using a configuration including a requisite minimum number of combined laser heads and digital mirror devices. For this reason, a laser scanning system having a small size and a light weight can be realized, and a configuration that is preferable also in terms of costs can be formed.

Figure 7:
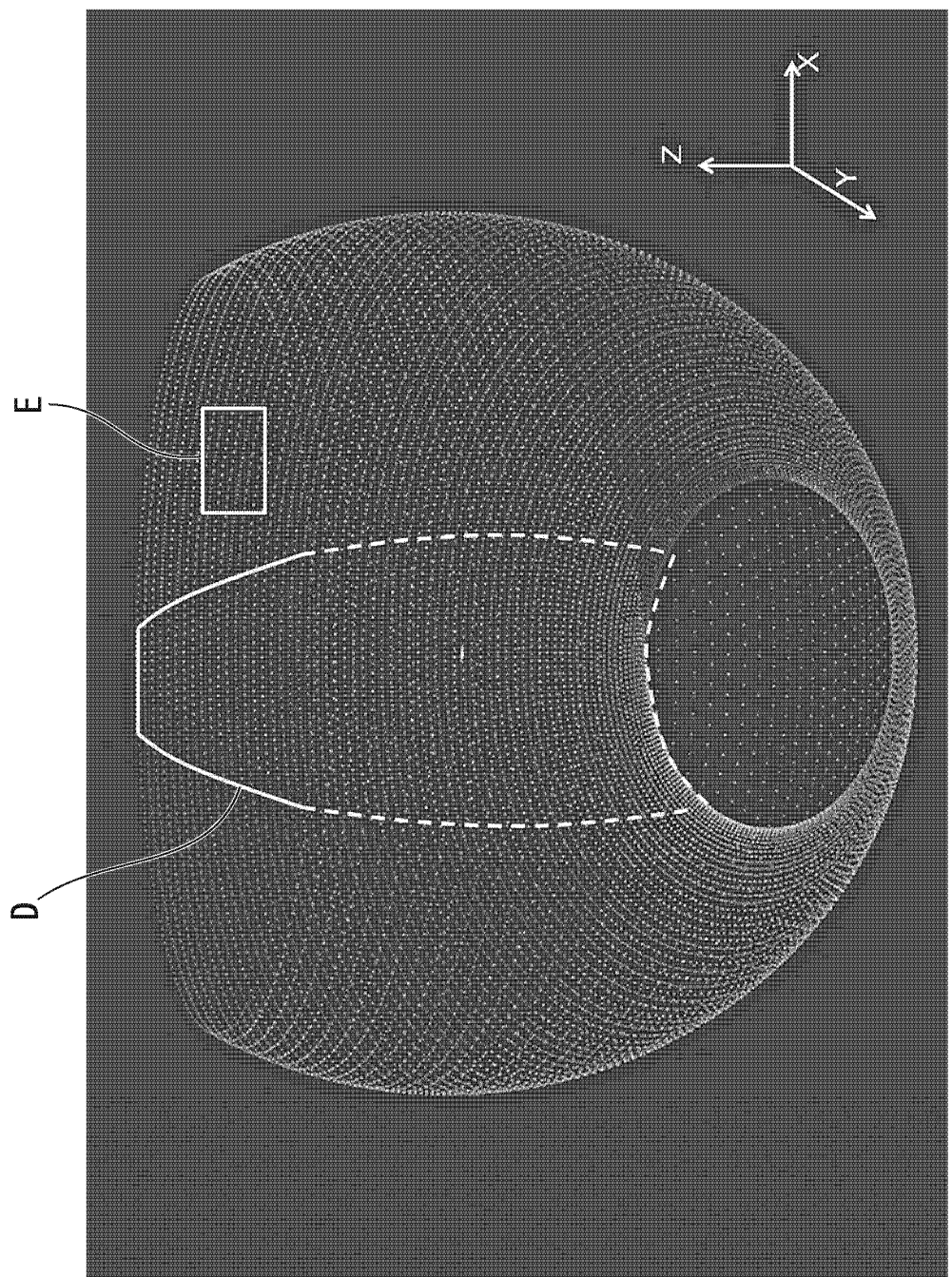
FIG. 7 is a diagram illustrating a radiation plane of a laser pulse of a case in which a rotary table is revolved in a rotation angle range of 0° to 360°, and the radiation direction of the laser pulse is rotated in a rotation angle range of 0° to 270°.

FIG. 7 is a diagram illustrating a radiation plane of a laser pulse of a case in which a rotary table is revolved in a rotation angle range of 0° to 360°, and the radiation direction of the laser pulse is rotated in a rotation angle range of 0° to 270°. This radiation plane is illustrated in a three-dimensional detection space formed by an X axis, a Y axis, and a Z axis in FIG. 6.

FIG. 7 illustrates the radiation plane at a uniform distance of laser pulses emitted from the laser scanner and thus, the radiation plane is a radiation plane having a sphere shape. In other words, a radiation distance of a laser pulse as a spherical face of the radiation plane extends from a radiation point of the laser scanner 11 as the origin (also the origin of the three-dimensional space according to this embodiment).

Accordingly, the coordinate point extracting unit 12 can acquire coordinates in the three-dimensional space using a radiation direction in which the laser pulse is emitted (a direction determined from a rotation angle in the revolution and a rotation angle in the rotation) and a measured distance from the origin to a spatial light point.

In other words, in the relation between the first rotation axis P1 and the second rotation axis P2 described above, the coordinate point extracting unit 12, when a spatial light point is acquired, associates the radiation direction of the laser pulse in the three-dimensional space formed from an x axis, a y axis, and a z axis with a rotation angle of the rotary table in the revolution at a time point at which the laser pulse is emitted and performs coordinate transformation into the radiation direction of the laser pulse in a three-dimensional space formed from an X axis, a Y axis, and a Z axis.

Then, the coordinate point extracting unit 12 calculates a distance to a reflection point of the laser pulse in the radiation direction of which the coordinates have been transformed and acquires coordinate values of the spatial light point of the laser pulse in the three-dimensional space formed from the X axis, the Y axis, and the Z axis.

FIG. 8 is a diagram illustrating a radiant density of a laser pulse changing in accordance with a rotation speed of a rotary table. FIG. 8(a) illustrates a track of a laser pulse emitted when the rotary table is rotated at a rotation speed of 1 Hz. FIG. 8(b) illustrates a track of a laser pulse emitted when the rotary table is rotated at a rotation speed of 0.5 Hz. FIG. 8(c) illustrates a track of a laser pulse emitted when the rotary table is rotated at a rotation speed of 0.1 Hz.

From FIGS. 8(a), 8(b), and 8(c) described above, it can be understood that the radiant density of a laser pulse emitted at a predetermined rotation angle range (a rotation angle range set as a detection rotation angle range) increases every time the rotation speed is decreased. A decrease in the rotation speed is realized by decreasing the amount of change in the rotation angle of the rotary table at a predetermined time to be smaller than that of the non-detection rotation angle range.

Figure 9:
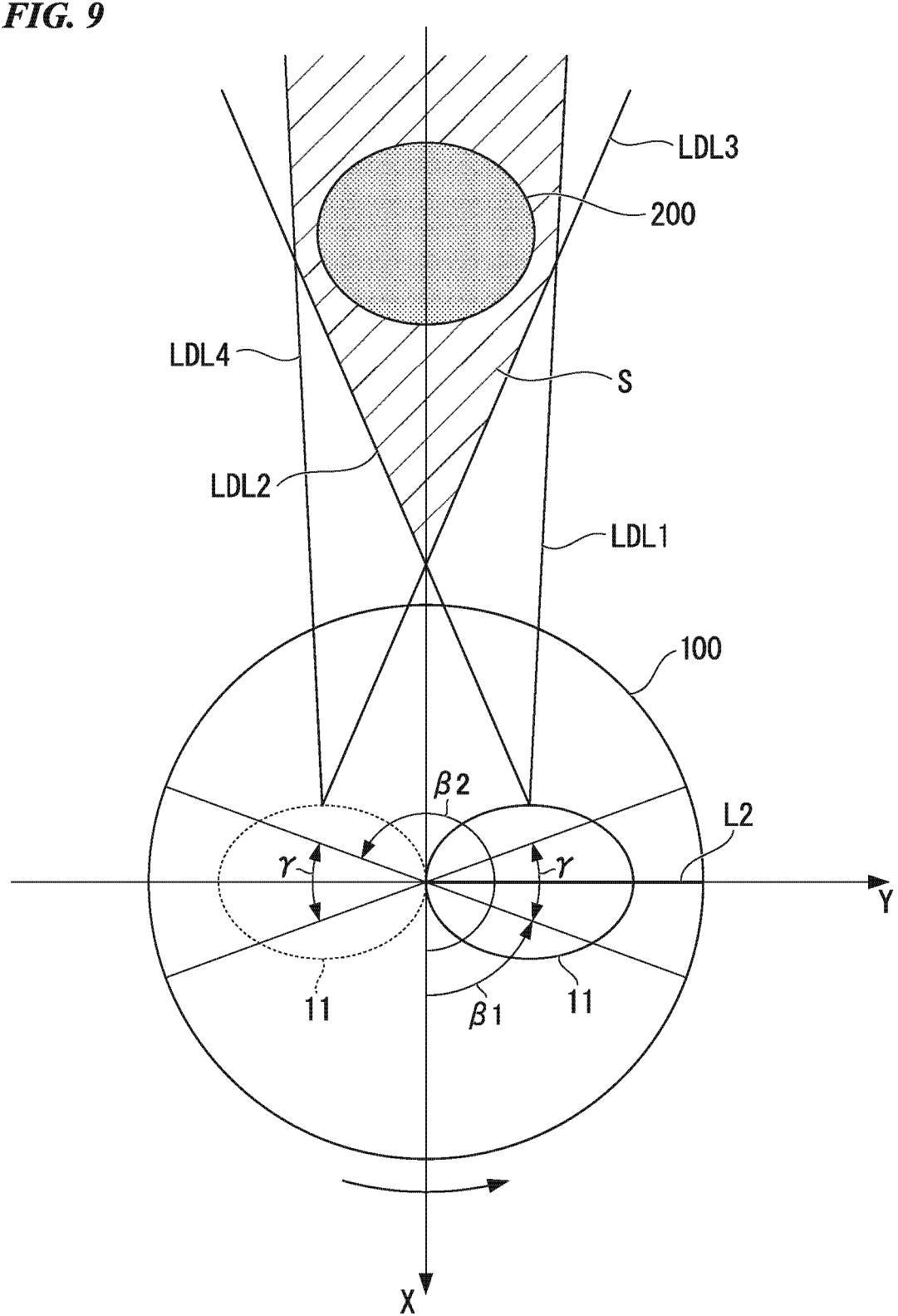
FIG. 9 is a diagram illustrating a detection rotation angle range and a non-detection rotation angle range in the rotation of a rotary table.

FIG. 9 is a diagram illustrating a detection rotation angle range and a non-detection rotation angle range in the rotation of a rotary table.

The detection rotation angle range illustrates an angle range of the rotary table 100 in which a laser pulse is emitted to a detection area in which a detection target object 200 is detected in a three-dimensional space.

In other words, in FIG. 9, in the rotation of the rotary table 100, in the case of a state in which the distance from the laser scanner 11 to the detection target object 200 is decreasing, a radiation direction in which a laser pulse is emitted to a detection area of the detection target object 200 is a range from a radiation direction LDL1 to a radiation direction LDL2. On the other hand, in the rotation of the rotary table 100, in the case of a state in which the distance from the laser scanner 11 to the detection target object 200 is increasing, a radiation direction in which a laser pulse is emitted to a detection area of the detection target object 200 is a range from a radiation direction LDL3 to a radiation direction LDL4.

In FIG. 9, the rotation angle is an angle formed by an X axis in a two-dimensional plane formed from the X axis and a Y axis parallel to the plane of the rotary table and a line LL acquired by projecting a segment joining a first rotation axis P1 and the center of a circle 101 onto the above-described two-dimensional plane formed from the X axis and the Y axis. A detection rotation angle range at the time of emitting a laser pulse in a range of the radiation direction LDL1 to the radiation direction LDL2 is from an angle β1 to an angle (β1+γ). On the other hand, a detection rotation angle range at the time of emitting a laser pulse in a range of the radiation direction LDL3 to the radiation direction LDL4 is from an angle β2 to an angle (β2+γ).

Accordingly, a detection rotation angle range σ illustrated in FIG. 9 is two angle ranges of β1≤σ≤(β1+γ) and (β2≤=≤ (β2+γ). By decreasing the rotation speed of the rotary table 100 in this detection rotation angle range σ, the radiant density of a laser pulse in the detection rotation angle range σ is increased. An angle range other than the two angle ranges of β1≤σ≤(β1+γ) and β2≤σ≤(β2+γ) described above is a non-detection rotation angle range.

Figure 10:
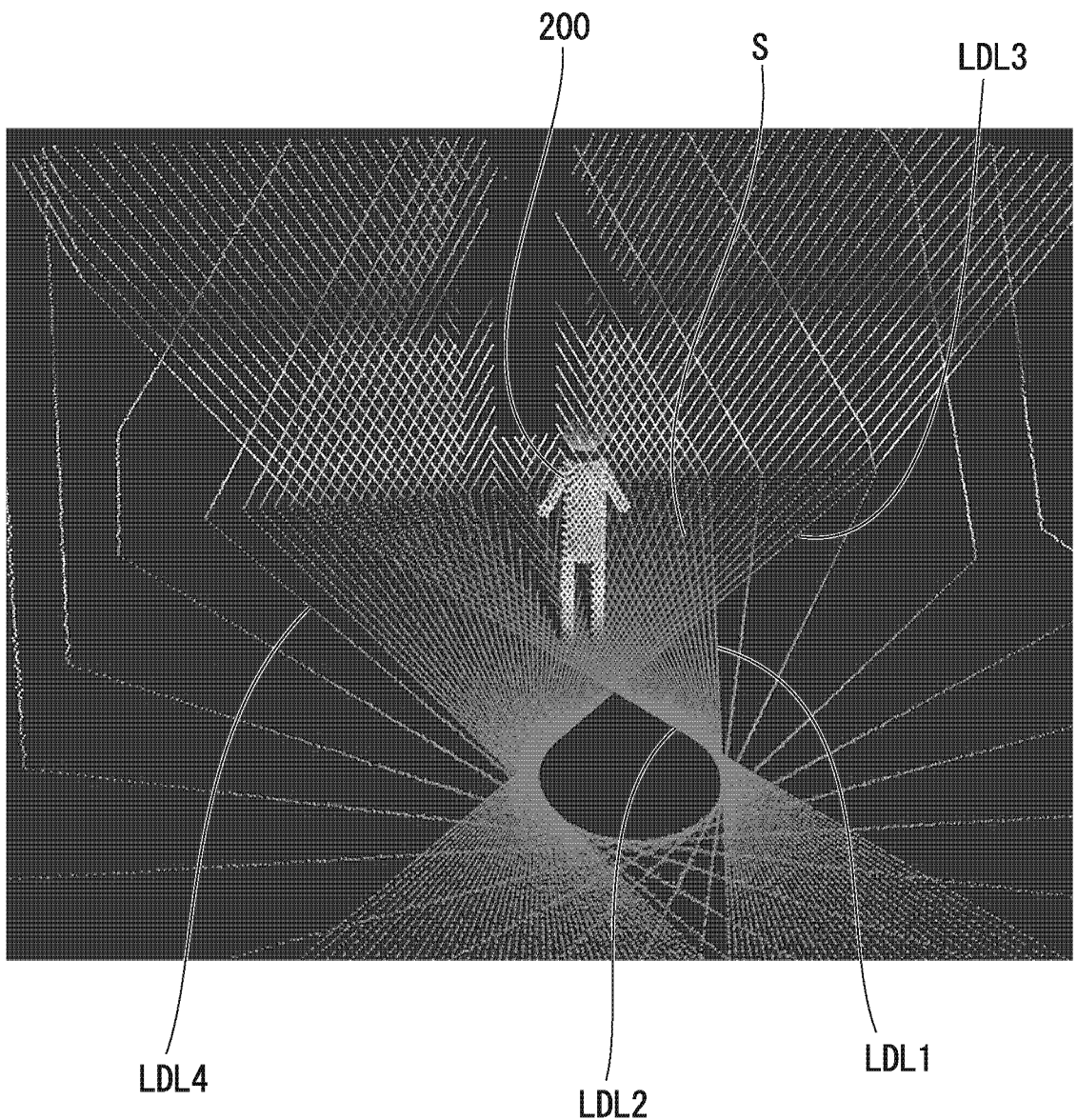
FIG. 10 is a diagram illustrating radiant densities of laser pulses in a detection rotation angle range and a non-detection rotation angle range according to the rotation speed of a rotary table.

FIG. 10 is a diagram illustrating radiant densities of laser pulses in a detection rotation angle range and a non-detection rotation angle range according to the rotation speed of a rotary table. It can be understood that, in correspondence with the two detection rotation angle ranges of β1≤σ≤(β1+γ) corresponding to the range of the radiation direction LDL1 to the radiation direction LDL2 of the laser pulse and β2≤σ≤(β2+γ) corresponding to the range of the radiation direction LDL3 to the radiation direction LDL4 of the laser pulse illustrated in FIG. 9, the radiant density of the laser pulse in a detection area S in which a detection target object 200 is detected is increased such that it is higher than in the non-detection rotation angle range. As illustrated in FIG. 10, the radiant density of the laser pulse in the detection area in which the detection target object 200 is detected can be caused to be higher (improved) than that of the other area, and the density of a point group of spatial light points in the detection rotation angle range is increased. In accordance with an increase in the density of the point group, the detection target detecting unit 17 can extract a feature amount of the point group of spatial light points in each separate cluster with higher accuracy. As a result, the detection target detecting unit 17, by using the extracted feature amount, can improve the accuracy of classifying a detection target represented by a point group of spatial light points of a separate cluster as a person or a three-dimensional object other than a person or the accuracy of identifying a detection target desired to be detected.

As described above, in this embodiment, the first rotation axis rotation speed of the rotary table is controlled such that it is changed in accordance with the presence of a detection target. By employing this configuration, in this embodiment, the density of a laser pulse emitted to a detection target is improved, and, for example, the detection accuracy of a detection target in a radiation area D of a laser pulse corresponding to the detection rotation angle range illustrated in FIG. 7 can be improved.

In addition, in this embodiment, in a place in which the shape of an object is complex, or many objects are densely present, by detecting a complex shape and a dense presence of many objects, as described above, the rotation speed of the rotary table in each of the detection rotation angle range and the non-detection angle range may be configured to be controlled. In other words, in this embodiment, a rotation angle range in which a complex shape or dense presence of many objects is detected is set as a detection rotation angle range, and the first rotation axis rotation speed of the rotary table is decreased in the detection rotation angle range such that it is lower than that of the non-detection angle range. In this embodiment, the density of a laser pulse emitted in the detection rotation angle range is increased, and the density of the laser pulse emitted to the other areas is decreased. Accordingly, in this embodiment, for an area for which a detection process having high accuracy is necessary, a detection rotation angle range is set, and sufficient information can be acquired by concentrating resources.

In addition, in this embodiment, as described above, a laser pulse has been described to be emitted at all the rotation angles in the range of 360 degrees around the first rotation axis as the center. However, a configuration may be employed in which a necessary radiation rotation angle range that is an arbitrary rotation angle range in which the rotary table is rotated around the first rotation axis at the first rotation axis rotation speed, and detection of a detection target is required is set, and a laser pulse is emitted only through rotation reciprocating over an arc in the necessary radiation rotation angle range. In the arc of the necessary radiation rotation angle range, the detection rotation angle range and the non-detection angle range described above are set. In this case, the laser pulse radiation control unit 15 performs control of the laser scanner 11 such that a laser pulse is emitted only in a case in which the rotation angle of the rotary table is in the necessary radiation rotation angle range.

In addition, in this embodiment, as described above, a configuration has been described in which a detection rotation angle range is acquired in correspondence with the position of a detection target detected using a laser pulse in a three-dimensional space. However, a configuration may be employed in which a detection target presence area that is an area in which a detection target is present in a three-dimensional detection space is acquired from a captured image acquired using an imaging apparatus using charge coupled devices (CCD), a complementary metal oxide semiconductor (CMOS), or the like, and a detection rotation angle range is acquired in association with this detection target presence area. In such a case, the detection target detecting unit 17 performs a coordinate transformation of coordinates of a detection target in an image space of the captured image into a detection space from the captured image captured by the imaging apparatus, and a detection rotation angle range is acquired in association with the coordinate-transformed detection target presence area.

Second Embodiment

The configuration of a laser scanning system according to a second embodiment of the present invention is similar to that according to the first embodiment illustrated in FIG. 1. Hereinafter, only operations of the laser scanning system according to the second embodiment that are different from those according to the first embodiment will be described.

In the first embodiment, the second rotation axis rotation speed at which the radiation direction of a laser pulse in the laser scanner 11 is rotated around the second rotation axis has been described as being fixed (constant speed).

In the second embodiment, in correspondence with a detection area in which a detection target is detected, in addition to a detection rotation angle range (hereinafter, referred to as a first detection rotation angle range) and a non-detection angle range (first non-detection angle range) in rotation angles with respect to a first rotation axis, a second detection rotation angle range and a second non-detection rotation angle range are also present in rotation angles with respect to a second rotation axis. The second detection angle range represents a rotation angle range, in which the radiation direction of a laser pulse is rotated with respect to the second rotation axis, corresponding to an area in which a detection target is present in the laser scanner. On the other hand, the second non-detection angle range represents a rotation angle range, in which the radiation direction of a laser pulse is rotated with respect to the second rotation axis, corresponding to an area in which a detection target is not present in the laser scanner.

A rotation angle range selecting unit 19, by using coordinate information of a separate cluster that is a detection target, which is supplied from a tracking unit 18, in a three-dimensional space, acquires a first detection rotation angle range that is a rotation angle range in revolution of a rotary table with respect to the first rotation axis in which a laser pulse is emitted to an area in which a detection target is present and a second detection rotation angle range that is a rotation angle range in rotation with respect to the second rotation axis in the radiation direction of the laser pulse. In addition, the rotation angle range selecting unit 19 sets rotation angles in revolution with respect to the first rotation axis other than the first detection rotation angle range described above as a first non-detection rotation angle range and sets rotation angles in rotation with respect to the second rotation axis other than the second detection rotation angle range described above as a second non-detection rotation angle range.

A table rotation speed control unit 14 (first rotation speed control unit) changes a first rotation axis rotation speed of the rotary table in the first detection rotation angle range and the first non-detection rotation angle range by controlling a table rotation mechanism unit 13.

In addition, a laser pulse radiation control unit 15 (second rotation speed control unit) changes a second rotation axis rotation angle in the radiation direction of a laser pulse in the laser scanner 11 in the second detection rotation angle range and the second non-detection rotation angle range.

Here, the laser pulse radiation control unit 15 decreases a second rotation axis rotation speed in the second detection rotation angle range such that it is lower than that in the second non-detection rotation angle range and, similar to the first detection rotation angle range, increases the radiant density of the laser pulse in the second detection rotation angle range. Here, the decreasing of the second rotation axis rotation speed represents that the amount of change in the rotation angle in the radiation direction of the laser pulse in a predetermined time is smaller than that in the second non-detection rotation angle range.

In addition, in radiation conditions in which the radiant density of the laser pulse can be increased in the second detection rotation angle range, the second rotation axis rotation speed in the second detection rotation angle range may be controlled such that it is higher than the second rotation axis rotation speed in the second non-detection rotation angle range. For example, the radiation conditions may be conditions in which the second rotation axis rotation speed in the second detection rotation angle range is higher than the second rotation axis rotation speed in the second non-detection rotation speed range, and a next laser pulse is emitted to a position different from a position to which a previous laser pulse has been emitted in the second detection rotation angle range. By controlling the emission of the laser pulse to satisfy this radiation condition, the radiation density of the laser pulse in the second detection rotation angle range may be increased such that it is higher than that in the second non-detection rotation angle range. At this time, the table rotation speed control unit 14 changes a rotation angle in the revolution in synchronization with a timing at which rotation of the laser scanner 11 in the radiation direction ends in the rotation angle range in which a laser pulse is emitted.

As described above, the laser pulse radiation control unit 15 controls the second rotation axis rotation speed in the second detection rotation angle range and the second non-detection rotation angle range in synchronization with a case in which the rotation angle in the revolution is in the first detection rotation angle range.

In other words, the first rotation axis rotation speed in each of the first detection rotation angle range and the first non-detection rotation angle range and the second rotation axis rotation speed in each of the second detection rotation angle range and the second non-detection rotation angle range are written and stored in a storage unit 20 in advance.

The table rotation speed control unit 14 reads the first rotation axis rotation speed for the first detection rotation angle range and the first rotation axis rotation speed for the first non-detection rotation angle range by referring to the storage unit 20. Then, the table rotation speed control unit 14 controls an angular velocity of a rotation angle (for example, controls the amount of change in the rotation angle in a predetermined time) in each of the first detection rotation angle range and the first non-detection rotation angle range using the read first rotation axis rotation speed.

In addition, the laser pulse radiation control unit 15 reads the second rotation axis rotation speed in each of the second detection rotation angle range and the second non-detection rotation angle range by referring to the storage unit 20. Then, the laser pulse radiation control unit 15 controls an angular velocity of a rotation angle (for example, controls the amount of change in the rotation angle in a predetermined time) in each of the second detection rotation angle range and the second non-detection rotation angle range using the read second rotation axis rotation speed.

As described above, in this embodiment, a radiation surface area (for example, the radiation area E in the three-dimensional space illustrated in FIG. 7) in which a laser pulse is emitted in a three-dimensional detection space can be set as a location area set in the first detection rotation angle range and the second detection angle range and as an area in which the radiant density of the laser pulse is increased. For this reason, in this embodiment, compared to the radiation surface area according to the first embodiment (for example, the radiation area D in the three-dimensional space illustrated in FIG. 7), emission of a laser pulse as resources for detecting a detection target can be further concentrated, and accordingly, a detection target can be more finely detected than in the first embodiment.

In addition, the laser pulse radiation control unit 15 may have a configuration in which the second rotation axis rotation speed is controlled in each of the second detection rotation angle range and the second non-detection rotation angle range for the entire angle range of the revolution without being synchronized with a case in which the rotation angle in the revolution is in the first detection rotation angle range.

In addition, in the embodiment, in the laser scanner 11, when the rotation speed in the radiation direction of the laser pulse in the second detection rotation angle range is changed, a configuration has been described in which the laser pulse is emitted after the rotation angle is changed by a predetermined amount of change.

However, in this embodiment, a configuration may be employed in which a timing at which the laser pulse is emitted is controlled such that the second rotation axis rotation speed is constant, and the laser pulse is emitted until a predetermined rotation angle is reached without increasing the radiation density of the laser pulse in a predetermined rotation angle range by adjusting the amount of change in the rotation angle. In other words, this embodiment may employ a configuration in which the radiant density of the laser pulse in the second detection rotation angle range is increased by increasing the number of times of emission of the laser pulse for a predetermined time in the radiation direction.

Third Embodiment

Figure 11:
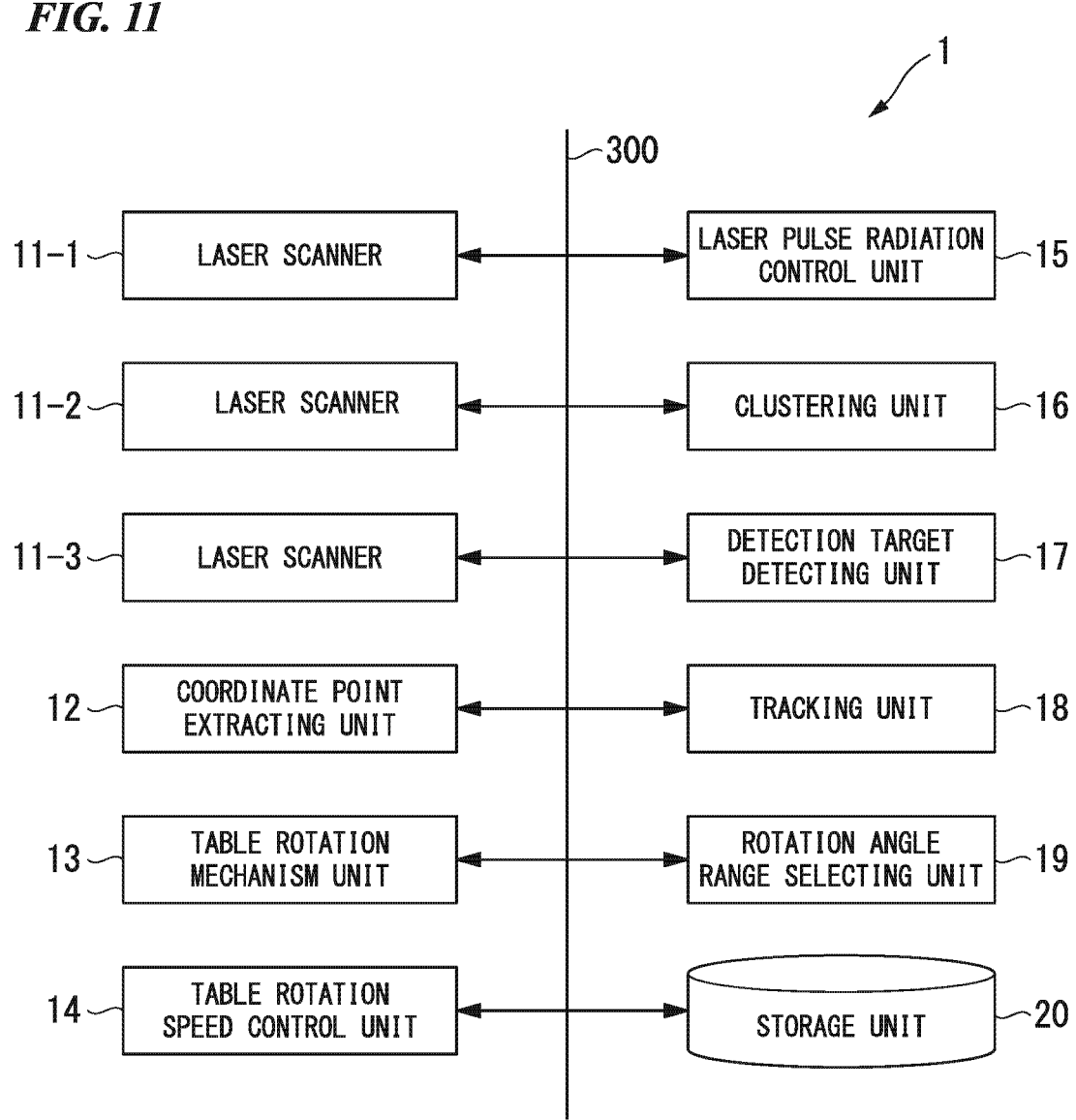
FIG. 11 is a diagram illustrating an example of the configuration of a laser scanning system according to a second embodiment.

In the first embodiment and the second embodiment, although one laser scanner is disposed in the rotary table, a plurality of two or three or more laser scanners (the laser scanners 11 according to the first embodiment or the second embodiment) may be configured to be disposed in a rotary table. FIG. 11 is a diagram illustrating an example of the configuration of a laser scanning system according to a second embodiment. The laser scanning system according to the second embodiment illustrated in FIG. 11 includes: laser scanners 11_1, 11_2, and 11_3; a coordinate point extracting unit 12; a table rotation mechanism unit 13; a table rotation speed control unit 14; a laser pulse radiation control unit 15; a clustering unit 16; a detection target detecting unit 17; a tracking unit 18; a rotation angle range selecting unit 19; and a storage unit 20. In addition, a data bus 300 is a data bus through which data and control signals are delivered between the laser scanners 11_1, 11_2, and 11_3, the coordinate point extracting unit 12, the table rotation mechanism unit 13, the table rotation speed control unit 14, the laser pulse radiation control unit 15, the clustering unit 16, the detection target detecting unit 17, the tracking unit 18, the rotation angle range selecting unit 19, and the storage unit 20.

In the laser scanning system according to the second embodiment illustrated in FIG. 11, the same reference numerals are assigned to constituents the same as those of the first embodiment. A different point is in that the laser scanners 11_1, 11_2, and 11_3 having a configuration similar to that of the laser scanner 11 are disposed to replace one laser scanner 11.

For example, in the configuration illustrated in FIG. 11, in a case in which the three laser scanners 11_1, 11_2, and 11-3 are disposed in the rotary table, the three laser scanners 11_1, 11_2, and 11-3 are disposed at three contrast positions having the first rotation axis as the center.

Each of the three laser scanners 11_1, 11_2, and 11-3 has a configuration similar to that of the laser scanner 11 described above and performs an operation similar thereto.

In addition, in a case in which the three laser scanners 11_1, 11_2, and 11-3 are disposed at three contrast positions in the rotary table, the table rotation speed control unit 14 performs control such that rotation angles at which laser pulses are emitted in the revolution are not the same rotation angles in one turn of the laser scanners. In other words, the table rotation speed control unit 14 rotates the rotary table at a first rotation axis rotation speed on the basis of the amounts of change in the rotation angles set such that the rotation angles at which laser pulses are emitted by the three laser scanners do not overlap each other at one position. Accordingly, by using the three laser scanners 11_1, 11_2, and 11-3, the radiant density of laser pulses is three times that according to the first embodiment, in other words, the density of spatial light points is three times that according to the first embodiment, and the accuracy of detection of a detection target can be improved.

In addition, the rotation angle range selecting unit 19, as described above in the first embodiment, defines a first detection rotation angle range in correspondence with the position in a detection space at which a detection target is detected for each of the laser scanners 11_1, 11_2, and 11-3.

Then, the table rotation speed control unit 14, for each of the laser scanners 11_1, 11_2, and 11-3, performs control of decreasing the first rotation axis rotation speed in the first detection rotation angle range set for each thereof.

Accordingly, in this embodiment, the radiant density of laser pulses for the first detection rotation angle range can be increased. In other words, according to this embodiment, the radiant density of laser pulses can be increased for the radiation area D of laser pulses in the detection space illustrated in FIG. 7.

Here, also in a case in which the first rotation axis rotation speed is decreased in the first detection rotation angle range, the table rotation speed control unit 14 rotates the rotary table in accordance with the control described above. In other words, the table rotation speed control unit 14 rotates the rotary table on the basis of the set amounts of change in the rotation angle such that the rotation angles of the three laser scanners emitting laser pulses in the revolution are not the same rotation angle in one turn of each of the laser scanners.

In addition, in this embodiment, similar to the second embodiment, a configuration may be employed in which the first rotation axis rotation speed and the second rotation axis rotation speed are respectively controlled such that they are respectively decreased in the first detection rotation angle range and the second detection rotation angle range defined on the basis of a position of the detection target in the detection space. According to this embodiment, also in such a configuration, the radiant density of laser pulses in a predetermined area (the radiation area E illustrated in FIG. 7) in the three-dimensional detection space can be increased. Also when this radiant density is increased, the table rotation speed control unit 14 revolves the rotary table around the first rotation axis as its center on the basis of the amounts of change in the rotation angles set such that the rotation angles at which laser pulses are emitted in the revolution are not the same rotation angle in one turn of the laser scanner.

As described above, in this embodiment, in the case of the configuration in which the second rotation axis rotation speed in the radiation direction of the laser pulse is constant, the amounts of change in the rotation angles are controlled to be changed such that the first rotation axis rotation speed of the rotary table in the detection rotation angle range is lower than that in the first non-detection rotation angle range, and rotation angles at which laser pulses of a plurality of laser scanners are emitted are not the same. In this way, according to this embodiment, the density of laser pulses emitted to an area (the radiation area D illustrated in FIG. 7) in which a detection target is present can be increased such that it is higher than that according to the first embodiment, and the detection accuracy of a detection target can be improved.

In addition, according to this embodiment, in the case of the configuration in which the second rotation axis rotation speed in the second authority angle range is changed, the first rotation axis rotation speed of the rotary table in the first detection rotation angle range is controlled to be changed to be decreased in accordance with the presence of a detection target such that rotation angles at which laser pulses of a plurality of laser scanners are emitted are not the same. In addition, according to this embodiment, by decreasing the second rotation axis rotation speed in the second detection rotation angle range of each laser scanner such that it is lower than that in the second detection rotation angle range, the radiant density of laser pulses of a predetermined area (the radiation area E illustrated in FIG. 7) in which a detection target is present in a three-dimensional detection space can be increased according to location, whereby the detection accuracy of a detection target can be improved.

In addition, although each of the first embodiment, the second embodiment, and the third embodiment described above has a configuration of being mounted in a car, a robot, or the like traveling on the ground as an example in the description presented above, the present invention is not limited thereto. Thus, the embodiment may have a configuration of being mounted in a flying object (for example, an unmanned flying object that is wirelessly operated), and the whole three-dimensional space in the surroundings of the flying object in the air may operate as a detection space in which a detection target is detected. In addition, each of the first embodiment, the second embodiment, and the third embodiment may be mounted in a submarine or the like, and the whole three-dimensional space in the surroundings of the submarine in the water, similar to the case of the air described above, may be set as a detection space in which a detection target is detected.

In addition, in each of the first embodiment, the second embodiment, and the third embodiment described above, separate clusters generated by the clustering unit 16 are set as detection targets by the detection target detecting unit 17 and are classified into persons and three-dimensional objects other than persons, and the persons are tracked. However, in each of the first embodiment, the second embodiment, and the third embodiment described above, it is apparent that the criterion of a feature amount used for dividing a three-dimensional object is not limited to persons. In each of the first embodiment, the second embodiment, and the third embodiment described above, criteria may be set for feature amounts for separating clusters corresponding to a plurality of three-dimensional objects other than persons used as detection targets.

Fourth Embodiment

Figure 12:
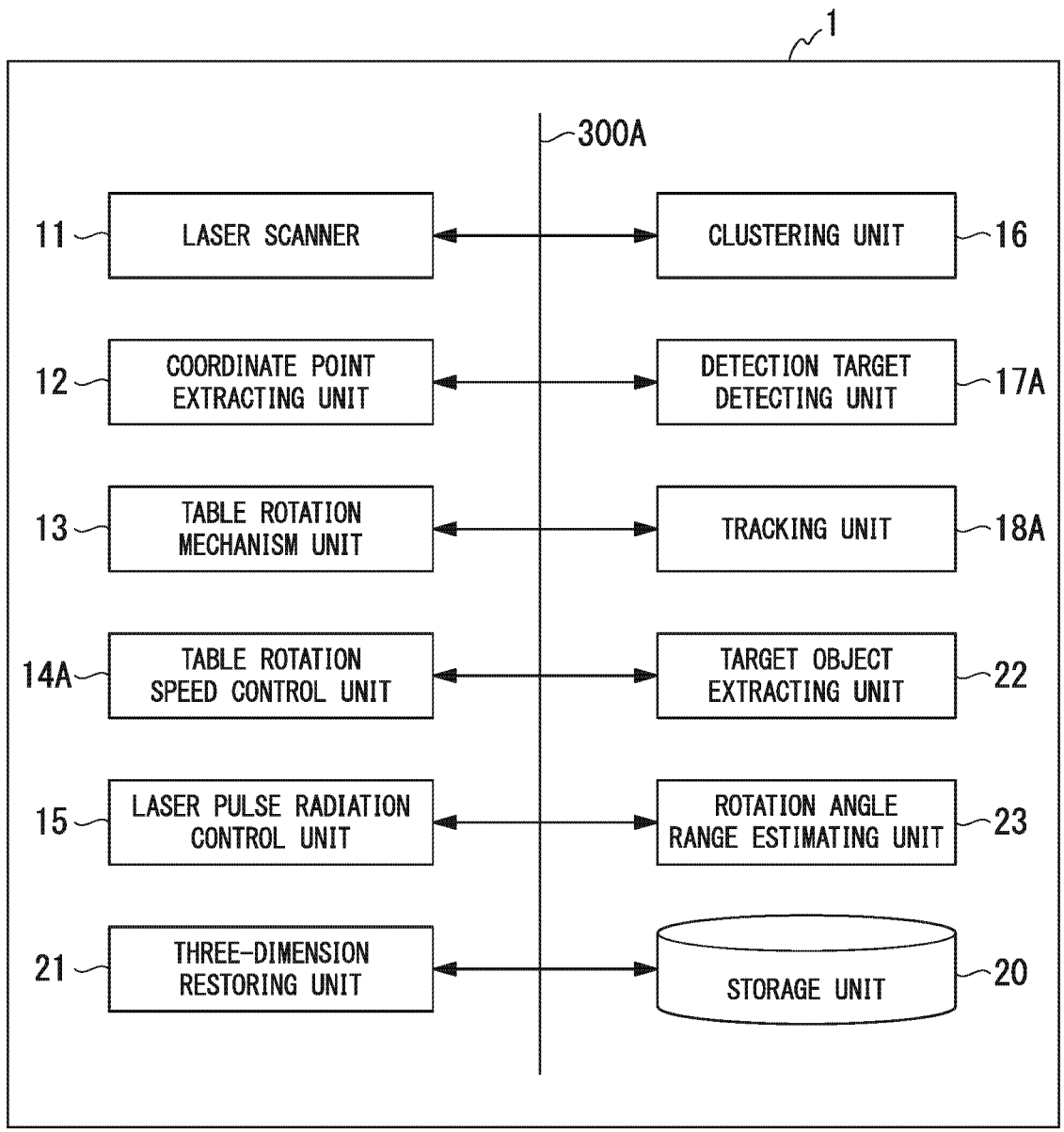
FIG. 12 is a diagram illustrating an example of the configuration of a laser scanning system according to a fourth embodiment.

FIG. 12 is a diagram illustrating an example of the configuration of a laser scanning system according to a fourth embodiment of the present invention. In the first to third embodiments described above, the emission of a laser pulse is controlled on the premise that a detection target is in a stopped state. This embodiment has a configuration in which emission of a laser pulse is controlled on the premise that a detection target moves. The laser scanning system 1 according to the fourth embodiment includes: a laser scanner 11; a coordinate point extracting unit 12; a table rotation mechanism unit 13; a table rotation speed control unit 14A; a laser pulse radiation control unit 15; a clustering unit 16;

a detection target detecting unit 17A; a tracking unit 18A; a storage unit 20; a three-dimension restoring unit 21; a target object extracting unit 22; and a rotation angle range estimating unit 23. In addition, a data bus 300A is a data bus through which data and control signals are delivered between the laser scanner 11, the coordinate point extracting unit 12, the table rotation mechanism unit 13, the table rotation speed control unit 14A, the laser pulse radiation control unit 15, the clustering unit 16, the detection target detecting unit 17A, the tracking unit 18A, the storage unit 20, the three-dimension restoring unit 21, the target object extracting unit 22, and the rotation angle range estimating unit 23. In the fourth embodiment, the same reference numerals are assigned to constituents the same as those of the first embodiment. Hereinafter, configurations and operations different from those according to the first embodiment will be described.

In this embodiment, the detection target detecting unit 17A, similar to the first embodiment, extracts separate clusters in units of detection targets. In the first embodiment, detection targets are classified into persons and three-dimensional objects other than persons. However, in this embodiment, as candidates for objects which are targets (hereinafter, referred to as target objects) (hereinafter, referred to as target object candidates) to which a laser pulse having a relatively high radiant density is emitted, objects of shapes and states set in advance, for example, a stopped state, a moving state, and the like are extracted.

The tracking unit 18A performs a prediction of a position of each of extracted target object candidates at a predetermined time using a Kalman filter. Here, the tracking unit 18A detects whether or not a separate cluster of a target object candidate is moving in addition to the process of the tracking unit 18 according to the first embodiment. In other words, the tracking unit 18A determines whether a target object candidate is in the stopped state or the moving state.

The three-dimension restoring unit 21 performs a coordinate transformation of coordinate values of spatial light points generated by the coordinate point extracting unit 12 using a rotation matrix and a translation matrix. The three-dimension restoring unit 21 performs a coordinate transformation from a detection space coordinate system into a reference coordinate system that is a predetermined reference three-dimensional coordinate system. The rotation matrix and the translation matrix are supplied from an external device to the laser scanning system as known matrixes. Here, the detection space coordinate system is a three-dimensional coordinate system of a detection space of the laser scanning system at a time point at which a laser is emitted and is a three-dimensional coordinate system having a point on the Z axis illustrated in FIG. 6 as its origin. In addition, the reference coordinate system according to this embodiment, for example, is a world coordinate system as a management space managed by another device in which the position of the laser scanning system is represented. Here, the three-dimension restoring unit 21 performs a coordinate transformation of coordinate values of a generated spatial light point from a detection space coordinate system to a reference coordinate system every time a coordinate point is generated. Accordingly, the laser scanning system according to this embodiment can add a three-dimensional shape of a target object detected by the laser scanning system to the world coordinate system of the management space.

In addition, each of the detection target detecting unit 17A and the tracking unit 18A described above performs a process of detecting a detection target at time points at which the rotary table makes one revolution in the rotation angle range of 0° to 360°, in other words, a time point at which a laser pulse is emitted to the whole detection space corresponding to a scanning range. The laser pulse is emitted to the scanning range with a predetermined density as the rotary table makes one revolution. The detection target detecting unit 17A acquires coordinate values of each spatial light point representing a three-dimensional shape of the periphery of the laser scanning system in the reference coordinate system. The detection target detecting unit 17A performs a process of extracting separate clusters from this three-dimensional shape.

The target object extracting unit 22 extracts a target object corresponding to an extraction condition set in advance from the target object candidates using a result of the tracking process performed by the tracking unit 18A. Here, the extraction condition is a condition that is arbitrary set by a user in advance for extracting a target object to which a laser pulse is emitted with a relatively high density. The target object is a detection target from which a three-dimensional shape and movement of an object are desired to be acquired particularly finely among detection targets.

The rotation angle range estimating unit 23 emits a laser pulse with a density higher than that of the other areas to the target object. For this reason, the rotation angle range estimating unit 23 estimates a detection rotation angle range in a rotation angle range (a rotation angle range of the first rotation axis) of the rotary table as an angle range in which a target object is present. In a case in which a target object is stopped with the target object used as the detection target object 200, the rotation angle range estimating unit 23 performs an operation similar to that of the rotation angle range selecting unit 19 described in the first embodiment with reference to FIG. 1. Here, the rotation angle range estimating unit 23 acquires a detection rotation angle range including a rotation angle range (β1≤σ≤(β1+γ) and β2≤σ≤(β2+γ) in FIG. 9) in which the target object is present as an emission range.

On the other hand, in a case in which the target object is moving, the rotation angle range estimating unit 23 estimates a detection rotation angle range using a predetermined calculation equation using a current position of the target object, a moving speed of the target object estimated by the tracking unit 18, a rotation angle of the first rotation axis representing an angular direction in which a laser pulse is emitted at the current time point, and the first rotation axis rotation speed. In other words, the rotation angle range estimating unit 23 acquires a time at which the emission direction of a laser pulse follows the target object using a relative distance between the target object and the laser scanning system and a relative speed between the target object and the first rotation axis rotation speed. The rotation angle range estimating unit 23 estimates the position of the target object at a requested time and acquires the range of the rotation angle of the first rotation axis corresponding to this position as a detection rotation angle range. In addition, the rotation angle range estimating unit 23 set an angle range other than the detection rotation angle range in the rotation angle range of the first rotation axis as a non-detection rotation angle range.

Then, the rotation angle range estimating unit 23 outputs the detection rotation angle range and the non-detection rotation angle range to the table rotation speed control unit 14A. At this time, in a case in which the target object is moving, the rotation angle range estimating unit 23 needs to cause the detection rotation angle range to follow the moving of the target object. For this reason, the rotation angle range estimating unit 23 sets a relative speed that is a speed difference between the moving speed of the moving target object in the rotation direction of the rotary table and a speed moving the detection rotation angle range to "0" and acquires a detection rotation angle range for each unit time in the future. The rotation angle range estimating unit 23 outputs the acquired detection rotation angle range to the table rotation speed control unit 14A. The table rotation speed control unit 14A decreases the first rotation axis rotation speed to a rotational number set in advance in correspondence with a detection rotation angle range supplied for each unit time, thereby increasing the emission density of the laser pulse. On the other hand, the table rotation speed control unit 14A increases the first rotation axis rotation speed in the non-detection rotation angle range other than the detection rotation angle range to a rotation number set in advance, thereby decreasing the emission density of the laser pulse.

As described above, this embodiment has a configuration in which a detection rotation angle range in which the emission density of the laser pulse is higher than that in the other angle range is set to include an area in which a detected target object is present in accordance with the extraction condition described above. As a result, according to this embodiment, the detection accuracy of a three-dimensional shape or the like of a target object corresponding to the extraction condition can be improved.

In addition, in this embodiment, different from the first embodiment in which a detection rotation angle range is set for a stopped detection target, it is premised that a target object is moving, and the moving position of the target object at a predetermined time is estimated. Accordingly, in this embodiment, the detection rotation angle range is controlled to be changed to include a target object in the detection rotation angle range to follow the moving of the target object. In this embodiment, the first rotation axis rotation speed of the rotary table is controlled to be changed in the detection rotation angle range for each unit time. For this reason, in this embodiment, a moving target object is constantly included in the detection rotation angle range, the emission density of the emitted laser pulse is increased, and the detection accuracy of a three-dimensional shape and the like of the target object in the detection rotation angle range can be improved.

In addition, in the second embodiment, the second rotation axis rotation speed for rotating the emission direction of the laser pulse around the second rotation axis is associated with the position of the target object, and the second detection rotation angle range is configured to be changed. In this embodiment, similar to the second embodiment, the second rotation axis rotation speed may be associated with the position of a target object, and the second detection rotation angle range may be configured to be changed. In this embodiment, in correspondence with the moving state of a target object, similar to the detection rotation angle range (first detection rotation angle range) according to this embodiment, the moving position of the target object is estimated for every unit time, and the second detection rotation angle range is acquired in correspondence with the moving position of the target object. In this way, in this embodiment, the second detection rotation angle range is updated for every unit time, and the second detection rotation angle range is caused to follow the moving of the target object.

According to this configuration, in this embodiment, an emission face area to which a laser pulse is emitted in the three-dimensional detection space is a location area that is set in the first detection rotation angle range and the second detection rotation angle range. In other words, in this embodiment, for example, similar to the radiation area E in the three-dimensional space illustrated in FIG. 7, a location area in which the emission density of a laser pulse is increased is set. In this embodiment, the location area is controlled to be moved following the target object such that the moving target object is included in the location area. According to this configuration, in this embodiment, for the fourth embodiment described above, emission of a laser pulse as resources for detecting a moving target object can be concentrated on the moving target object. In this embodiment, the three-dimensional shape of the target object can be detected more finely than in a case in which only the first rotation axis rotation speed is controlled.

Application Example of Fourth Embodiment

Figure 13:
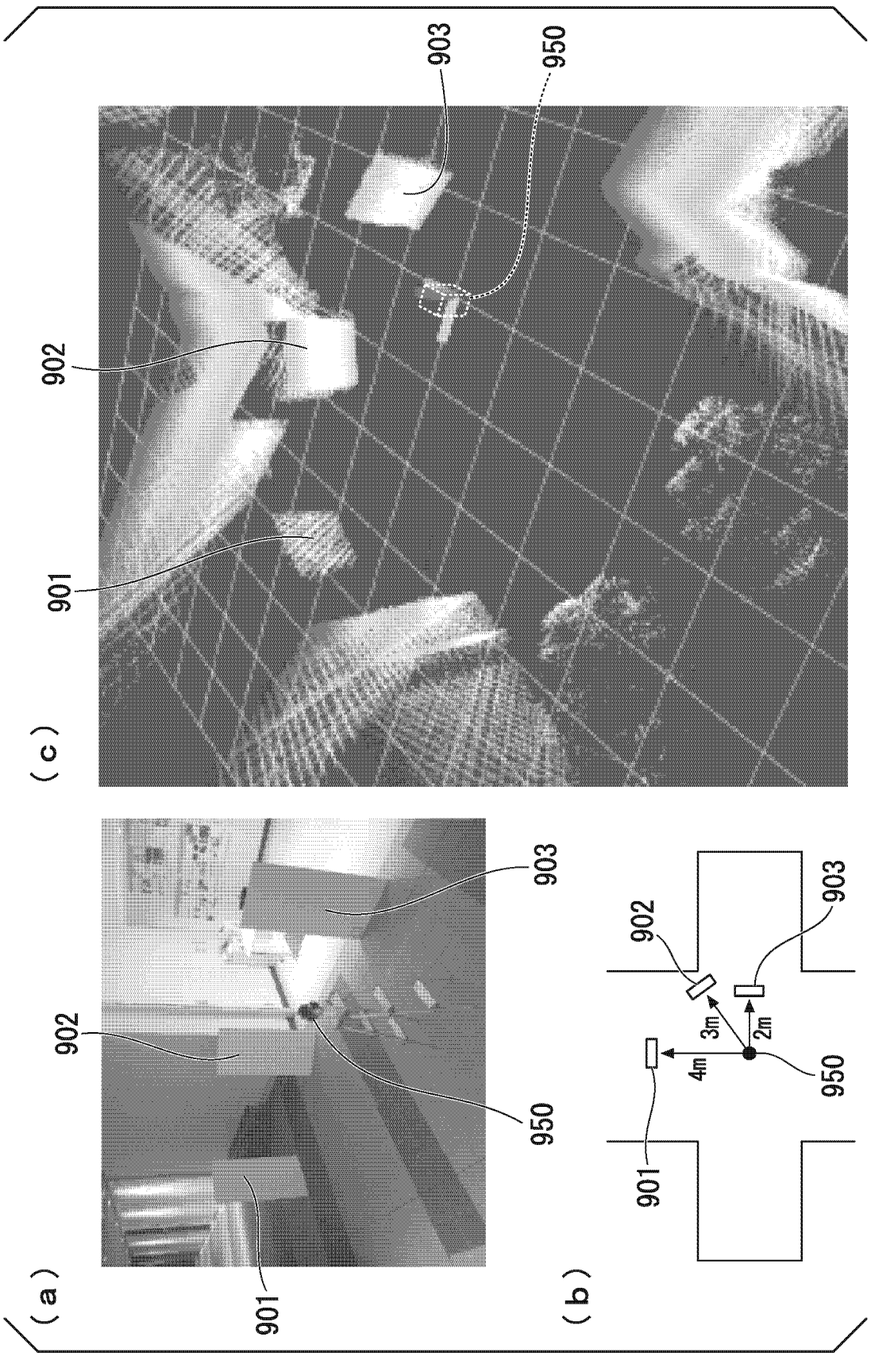
FIG. 13 is a diagram illustrating one example of a result of adjustment of a radiant density of laser pulses for a detection rotation angle range according to the fourth embodiment.

FIG. 13 is a diagram illustrating one example of a result of adjustment of a radiant density of a laser pulse for a detection rotation angle range according to the fourth embodiment. In the fourth embodiment, as described above, a target object is extracted from the detection target using the extraction condition, and the emission density of a laser pulse emitted to the extracted target object is controlled to be increased. In this application example, the extraction condition used for extracting a target object is that a detection target is a stopped object and is located at a position that is 3 m away from the laser scanning system. In an image illustrated in FIG. 13(*a*), target object candidates 901, 902, and 903 are disposed near a laser scanning system 950 (a laser scanning system having the configuration illustrated in FIG. 12). FIG. 13(*b*) is a plan view illustrating distances from the laser scanning system 950 to the target object candidates 901, 902, and 903. FIG. 13(*c*) illustrates that the target object candidate 902 is extracted as a target object, the rotation angle range of the first rotation axis including an area in which the target object candidate 902 is located is set as the detection rotation angle range of the laser scanning system, and a laser pulse is emitted. FIG. 13(*c*) illustrates that the emission density of a laser pulse for the target object candidate 902 is controlled such that it is higher than that for the target object candidate 903 that is located closer to the laser scanning system 950 than the target object candidate 902. In this way, from the application example illustrated in FIG. 13, according to the fourth embodiment, a target object is extracted in correspondence with the extraction condition, and the emission density of a laser pulse for the extracted target object is configured to be higher than that in the other area, whereby it can be understood that the target object can be finely detected.

Fifth Embodiment

Figure 14:
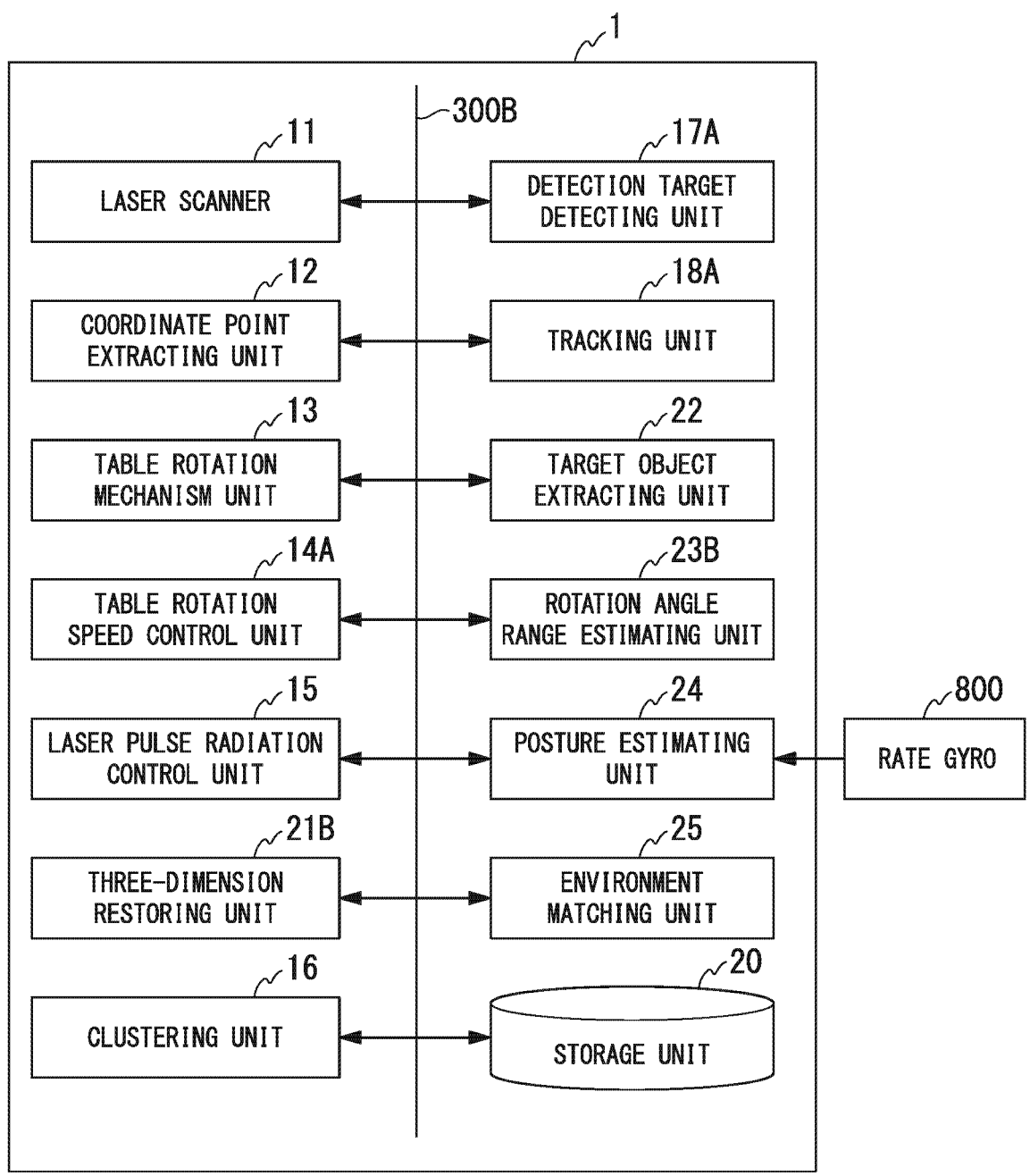
FIG. 14 is a diagram illustrating an example of the configuration of a laser scanning system according to a fifth embodiment.

FIG. 14 is a diagram illustrating an example of the configuration of a laser scanning system according to a fifth embodiment. As illustrated in FIG. 14, the laser scanning system 1 according to the fifth embodiment includes: a laser scanner 11; a coordinate point extracting unit 12; a table rotation mechanism unit 13; a table rotation speed control unit 14A; a laser pulse radiation control unit 15; a clustering unit 16; a detection target detecting unit 17A; a tracking unit 18A; a storage unit 20; a three-dimension restoring unit 21B; a target object extracting unit 22; a rotation angle range estimating unit 23B; a posture estimating unit 24; and an environment matching unit 25. In addition, a data bus 300B is a data bus through which data and control signals are delivered between the laser scanner 11, the coordinate point extracting unit 12, the table rotation mechanism unit 13, the table rotation speed control unit 14A, the laser pulse radiation control unit 15, the clustering unit 16, the detection target detecting unit 17A, the tracking unit 18A, the storage unit 20, the three-dimension restoring unit 21B, the target object extracting unit 22, the rotation angle range estimating unit 23B, the posture estimating unit 24, and the environment matching unit 25. In the fifth embodiment, the same reference numerals are assigned to constituents the same as those of the fourth embodiment. Hereinafter, configurations and operations different from those according to the fourth embodiment will be described. In this embodiment, similar to the first embodiment, the second embodiment, and the third embodiment, the laser scanning system is mounted in a movable body, of which the posture and the position are changed in a time series, moving at a predetermined moving speed. Here, the movable body, for example, is a vehicle, a person, an animal, a flying object, or the like. In this embodiment, control of emission of a laser pulse corresponding to the posture and the position of a movable body is performed in which a target object is detected in correspondence with the position and the position of the movable body. Accordingly, in this embodiment, the accuracy of detection of a target object is higher than that according to the first embodiment, the second embodiment, and the third embodiment.

The posture estimating unit 24 estimates the posture of the laser scanning system (movable body) at rotation angles (detected rotation angles) with respect to an x-axis (roll axis), a y axis (pitch axis), and a z axis (yawing axis) measured by a rate gyro 800. The rate gyro 800 is mounted in the movable body. The posture estimating unit 24 estimates the position of the movable body on the basis of a moving distance using the posture and a moving speed (to be described in detail later). In this embodiment, as a filter estimating a dynamic system state, for example, the posture and the position of the laser scanning system are estimated, for example, using Kalman filter. The posture estimating unit 24 estimates the posture and the position of the laser scanning system mounted in the movable body using a Kalman filter in a time series using the detected rotation angles from the rate gyro 800 and a phase speed of the movable body. In other words, the posture estimating unit 24 estimates the posture and the position of the laser scanner at a time point at which a laser pulse is emitted using the Kalman filter described above. This embodiment has been described to have a configuration in which the posture and the position are estimated using the Kalman filter. However, in this embodiment, a filter other than the Kalman filter may be used, as long as the filter is an infinite impulse response filter that can estimate the posture and the position of a predetermined dynamic system using measured values having errors.

In this way, in a case in which the laser scanning system is moving, the posture and the position of the laser scanning system change every time a laser pulse is emitted. Accordingly, the detection space coordinate system of the laser scanning system is changed to another detection space coordinate system having a different origin and different axial directions of the x axis, they axis, and the z axis every time a laser pulse is emitted.

For this reason, in the process of detecting a target object, each of coordinate values of spatial light points acquired in accordance with emission of a laser pulse is transformed from a different detection space coordinate system to a same reference coordinate system every time spatial light points are acquired. In addition, in the fourth embodiment, the world coordinate system has been described as the reference coordinate system. As the reference coordinate system according to this embodiment, not the world coordinate system but a detection space coordinate system (hereinafter, referred to as a t0 detection space coordinate system) acquired when the operation of the laser scanning system is started is used.

The posture estimating unit 24 outputs the posture and the position of the laser scanning system estimated using the Kalman filter to the three-dimension restoring unit 21B when a laser pulse is emitted.

The three-dimension restoring unit 21B acquires the amount of movement of the origin of the tn detection space coordinate system with respect to the reference coordinate system and changed angle amounts of the axial directions of the x axis, they axis, and the z axis using the posture and the position supplied from the posture estimating unit 24 in a time n in which laser is emitted. Here, the tn detection space coordinate system is a detection space coordinate system when a laser pulse is emitted in accordance with elapse of the time n after the operation of the laser scanning system is started. Then, the three-dimension restoring unit 21B acquires a rotation matrix and a translation matrix using the acquired amount of movement of the origin and changed angle amounts of the axial directions of the x axis, the y axis, and the z axis. The three-dimension restoring unit 21B transforms the coordinate values of spatial light points in the tn detection space coordinate system into coordinate values in the reference coordinate system using the rotation matrix and the translation matrix that are acquired.

In this way, the three-dimension restoring unit 21B can sequentially translate the coordinate values of spatial light points in the tn detection space coordinate system at the time of emitting a laser pulse into those of the reference coordinate system even when the posture and the moving distance of the laser scanning system are changed in a time series.

In addition, at a time point at which the rotary table makes one revolution in the laser scanning system, the three-dimension restoring unit 21B sequentially generates an image of a three-dimensional point group representing a three-dimensional shape of the periphery of the laser scanning system from a coordinate value group of spatial light points acquired from a laser pulse emitted to the radiation plane. The emission of a laser pulse to the whole radiation plane (whole scanning range) illustrated in FIG. 7 ends in one revolution of the rotary table. Then, every time the emission of a laser pulse to the whole radiation plane ends, the three-dimension restoring unit 21B generates a three-dimensional point group generated at the end time point m (hereinafter, referred to as an m time point three-dimensional point group). The three-dimension restoring unit 21B sequentially outputs the generated m time point three-dimensional point group to the environment matching unit 25.

The environment matching unit 25 extracts a three-dimensional point group acquired in the stopped state in the reference coordinate system (hereinafter, referred to as a "0" time point three-dimensional point group) and a wall face having a same horizontal plane in each m time point three-dimensional point group (for example, a plane perpendicular to a plane such as a wall of a building, a wall of a fence, or the like). Then, the environment matching unit 25 extracts a normal line (normal line vector) of a wall face from the wall face of each of the "0" time point three-dimensional point group and the m time point three-dimensional point group. Then, the environment matching unit 25 acquires an angle (three dimension) formed by a normal line of the wall face of the "0" time point three-dimensional point group and a normal line of the wall face of the m time point three-dimensional group and outputs information of the acquired angle formed by the two normal lines (normal line error information) to the posture estimating unit 24 (environment matching process). In the extraction of a normal line from the wall face, the environment matching unit 25 performs a normal line estimating process (a surface estimating process using the principal component analysis or the like) for the coordinate point group of the wall face.

In addition, the posture estimating unit 24 compares the rotation angles of the x axis, the y axis, and the z axis that are detected rotation angles supplied from the rate gyro 800 at a predetermined period with the posture of the laser scanning system estimated by the Kalman filter at that time point. Then, the posture estimating unit 24 adjusts parameters used for estimating the posture by the Kalman filter such that a result of the estimation is the posture acquired using the detected rotation angles supplied from the rate gyro 800.

In addition, the posture estimating unit 24 acquires differences between the postures and the positions of the laser scanning system at the time point at which the "0" time point three-dimensional point group is acquired and the time point m at which the m time point three-dimensional point group is acquired using the normal line error information supplied from the environment matching unit 25. The posture estimating unit 24 acquires the posture and the position of the laser scanning system at the time point m in the reference coordinate system using the acquired differences between the postures and the positions and the posture and the position at the time point at which the "0" time point three-dimensional point group is acquired.

Then, the posture estimating unit 24 compares the posture and the position generated on the basis of the normal line error information supplied from the environment matching unit 25 with the posture and the position estimated at the time point by the Kalman filter. The posture estimating unit 24 adjusts parameters of the Kalman filter used for estimating the posture and the position such that a result of the estimation of the Kalman filter becomes the posture and the position generated on the basis of the normal line error information. In addition, the posture estimating unit 24 acquires a movement distance moved between a time point m−1 and a time point m from positions acquired at the time point m−1 and the time point m. The posture estimating unit 24 acquires a moving speed by dividing the acquired movement distance by a time difference between the time point m and the time point m−1 and adjusts the parameters of the Kalman filter.

The rotation angle range estimating unit 23B estimates a detection rotation angle range in the rotation angle range (the rotation angle range of the first rotation axis) of the rotary table as an angle range in which a laser pulse is emitted with a higher emission density than the emission density of the other area for the extracted target object. At this time, in a case in which the target object is a stopped object, the rotation angle range estimating unit 23B acquires a detection rotation angle range including the rotation angle range in which the target object is present ($\beta 1 \leq \sigma \leq (\beta 1+\gamma)$ and $\beta 2 \leq \sigma \leq (\beta 2+\gamma)$ illustrated in FIG. 9) as an emission range in correspondence with the posture and the position of the laser scanning system that are estimated.

On the other hand, the rotation angle range estimating unit 23B estimates a detection rotation angle range using a predetermined calculation equation using the current position and the moving speed of the target object, the rotation angle of the first rotation axis of the current time point, the first rotation axis rotation speed, and the posture and the position of the laser scanning system. The moving speed is a moving speed of the target object that is estimated by the tracking unit 18A. The rotation angle of the first rotation axis of the current time point represents an angular direction in which a laser pulse is emitted.

In other words, the rotation angle range estimating unit 23B acquires a time in which the emission direction of a laser pulse is caused to follow the target object using a relative distance between the target object and the laser scanning system and a relative speed between the target object/the rotation angle of the first rotation axis/the laser scanning system. Then, the rotation angle range estimating unit 23B estimates the position of the target object and the posture and the position of the laser scanning system at the acquired time and acquires the range of the rotation angle of the first rotation axis corresponding to a result of the estimation as the detection rotation angle range. In addition, the rotation angle range estimating unit 23B sets an angle range other than the detection rotation angle range acquired as described above in the rotation angle range of the first rotation axis as a non-detection rotation angle range.

Figure 15:
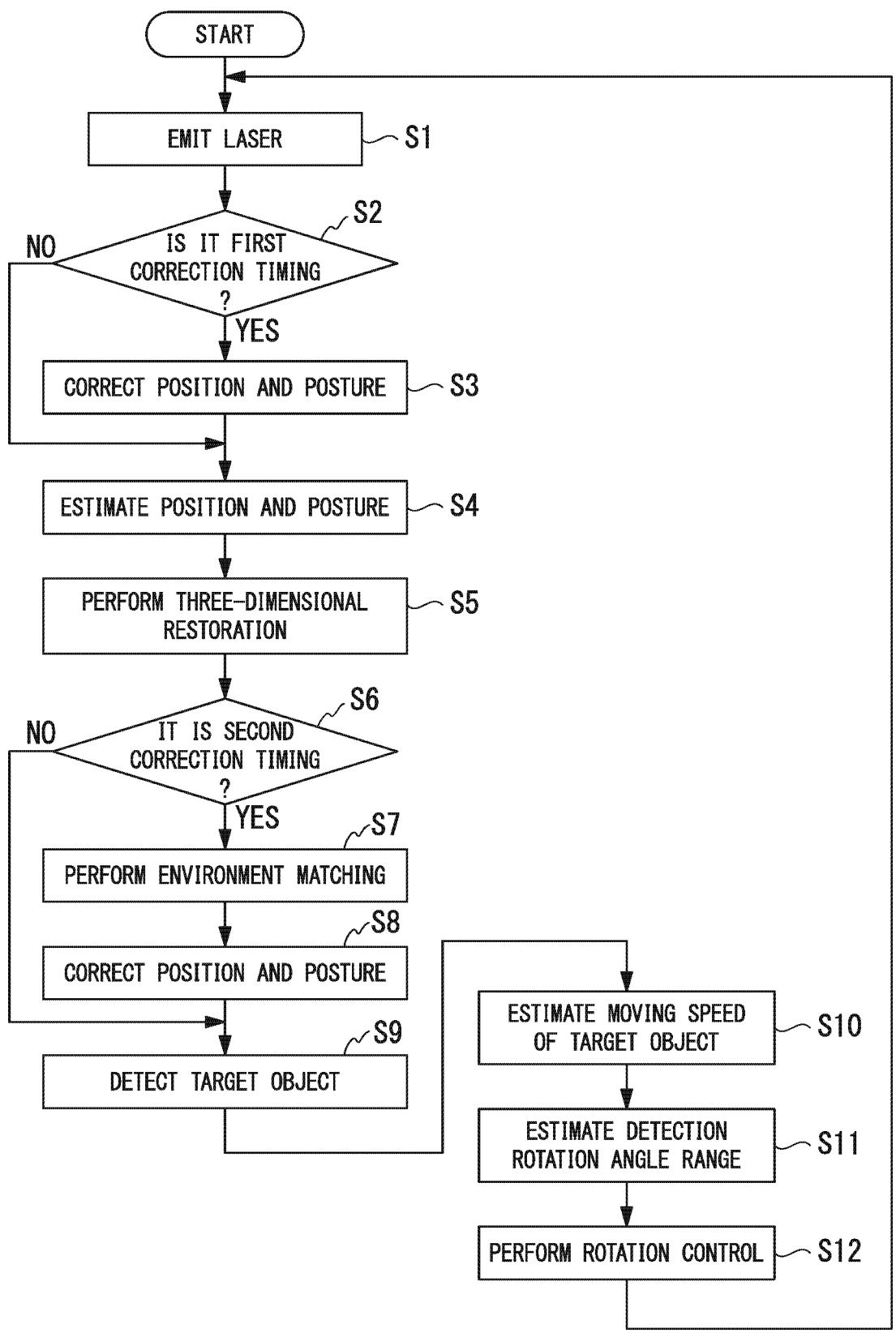
FIG. 15 is a flowchart illustrating an operation example of a process of estimating a posture and a position according to the fifth embodiment.

Next, FIG. 15 is a flowchart illustrating an operation example of a process of estimating a posture and a position according to the fifth embodiment of the present invention.

The laser scanner 11 emits a laser pulse at the posture and the position of the time point (Step S1).

The posture estimating unit 24 determines whether or not it is a first correction timing for the Kalman filter on the basis of whether or not a detection rotation angle is supplied from the rate gyro 800. At this time, in a case in which a detection rotation angle is supplied, the posture estimating unit 24 determines the first correction timing and causes the process to proceed to Step S3. On the other hand, in a case in which a detection rotation angle is not supplied, the posture estimating unit 24 determines that it is not the first correction timing and causes the process to proceed to Step S4 (Step S2).

The posture estimating unit 24 adjusts the parameters of the Kalman filter using the detection rotation angle supplied from the rate gyro 800 (Step S3). The posture estimating unit 24 estimates the posture and the position of the laser scanning system at the time of emitting laser using the Kalman filter (Step S4). The three-dimension restoring unit 21B transforms the coordinate values of each spatial light point in the to detection space coordinate system into coordinate values of the reference coordinate system using the posture and the position of the laser scanning system (Step S5).

The posture estimating unit 24 determines whether it is a second correction timing for the Kalman filter on the basis of whether or not the emission of the laser pulse for the whole radiation plane has ended. At this time, in a case in which the emission of the laser pulse for the whole radiation plane has ended, the posture estimating unit 24 determines that it is the second correction timing and causes the process to proceed to Step S7. On the other hand, in a case in which the emission of the laser pulse for the whole radiation plane has not ended, the posture estimating unit 24 determines that it is not the second correction timing and causes the process to proceed to Step S9 (Step S6).

The environment matching unit 25 performs an environment matching process and acquires normal line error information (Step S7). Then, the posture estimating unit 24 adjusts the parameters of the Kalman filter (corrects the position and the posture to be output by the Kalman filter)

using the normal line error information supplied from the environment matching unit 25 (Step S8). In this embodiment, on the basis of the correction process of the Kalman filter performed at each of the first correction timing and the second correction timing, the estimation of the posture and the position of the laser scanning system is performed as a fusion process using the rate gyro 800 and the environment matching.

The target object extracting unit 22 extracts a target object corresponding to the extraction condition from among target object candidates detected by the detection target detecting unit 17A and the tracking unit 18A (Step S9). Then, the target object extracting unit 22 acquires the moving speed of the target object at the current time point by acquiring a movement distance moved between the time point m−1 and the time point m and dividing this movement distance by a time difference between the time m and the time m−1 (Step S10).

The rotation angle range estimating unit 23B estimates a detection rotation angle range using a predetermined calculation equation using the position of the target object, the estimated moving speed of the target object, the rotation angle of the first rotation axis representing an angle at which the laser pulse is emitted, the first rotation axis rotation speed, and the posture and the position of the laser scanning system (Step S11).

Then, the table rotation speed control unit 14A decreases the first rotation axis rotation speed to a rotational number set in advance in correspondence with the detection rotation angle range supplied for every unit time. By decreasing the first rotation axis rotation speed, the table rotation speed control unit 14A causes the emission density of the laser pulse to be higher than that in the non-detection rotation angle range.

As described above, in this embodiment, similar to the fourth embodiment, a target object corresponding to the extraction condition set in advance is detected, and sets a detection rotation angle range in which the emission density of the laser pulse is higher than that in the other angle range to include an area in which the target object is present. By employing such a configuration, according to this embodiment, the emission density of a laser pulse emitted to a target object corresponding to the extraction condition is set to a high density, and the detection accuracy of a three-dimensional shape and the like can be improved.

In addition, in this embodiment, different from the fourth embodiment in which a detection rotation angle range of a case in which the laser scanning system is stopped is set, it is premised that a moving target object is detected using a movable laser scanning system. For this reason, according to this embodiment, the moving position of the moving target object is estimated, a detection rotation angle range is acquired in correspondence with the movement state of the laser scanning system. In this way, according to this embodiment, the detection rotation angle range is changed in correspondence with the movement of the laser scanning system to follow the moving of the target object such that the target object is included in the detection rotation angle range. According to this embodiment, the first rotation axis rotation speed of the rotary table is controlled for every unit time in correspondence with the moving of the target object. For this reason, according to this embodiment, in correspondence with the moving of the target object that is constantly moving, the detection rotation angle range can be caused to follow therewith, and the detection accuracy of the three-dimensional shape of the target object is improved through the detection of the detection rotation angle range.

As described above, in the fourth and fifth embodiments, the rotation angle range estimating units 23 and 23B estimate the detection rotation angle range and the non-detection rotation angle range on the basis of a relative position and a relative speed between the detection target and the laser scanning system. The detection rotation angle range represents a range of the rotation angle of the first rotation axis in which the detection target detecting unit 17A detects a detection target. The non-detection rotation angle range represents a range of the rotation angle of the first rotation axis in which detection of a detection target is not performed.

In addition, in the first embodiment, the imaging apparatus has been described to be disposed in the laser scanning system. In this case, the laser scanning system may include a configuration (three-dimensional shape type determining unit) determining the type of three-dimensional shape in a three dimensional space of the periphery detected by a laser pulse using a captured image captured by the imaging apparatus. Here, the type of three-dimensional shape in the three-dimensional space is a type representing a difference in the shape such as a road, a grass, a tree, a fence, a river, or a groove. For example, in a case in which a movable body in which the laser scanning system is mounted, the movable body travels in a three-dimensional space detected by the laser scanning system. On the other hand, in a case in which the laser scanning system is moving in the three-dimensional space, the three-dimensional shape type determining unit, for example, determines the type of a three-dimensional shape in the traveling direction of the movable body using a captured image and determines that a road is present at the center of a grass area.

In other words, the three-dimensional shape type determining unit extracts each image area in the captured image corresponding to each three-dimensional shape in the three-dimensional space and determines the type of the three-dimensional shape of the image area. At this time, the three-dimensional shape type determining unit extracts a type corresponding to the three-dimensional shape by searching a table in which a feature amount and the type of three-dimensional shape are associated with each other on the basis of a plurality of feature amounts such as a color, a shape, a texture, and the like of the extracted image area.

By using a result of the determination of the type, the three-dimensional shape type determining unit detects whether or not the movable body, in which the laser scanning system is mounted, can be moved in accordance with the type of three-dimensional shape in the surroundings of the three-dimensional space and outputs a result of the detection to a control unit of the movable body. Accordingly, for example, in a case in which the laser scanning system is mounted in the movable body, the control unit of the movable body can prevent the movable body from intruding to an area in which the movable body cannot travel.

At this time, the degree of matching between each coordinate point in the three-dimensional space and a coordinate point of a captured image (two-dimensional space) captured by the imaging apparatus is adjusted through camera calibration.

By recording a program used for realizing each function of the process of detecting a detection target in each of the laser scanning systems illustrated in FIGS. 1, 11, 12, and 14 on a computer-readable recording medium and causing a computer system to read and execute the program recorded on this recording medium, the process of detecting a detection target may be performed. The "computer system" described here includes an OS and hardware such as peripherals.

In addition, the "computer system" includes home page provision environments (or display environments) in a case in which a WWW system is used.

Furthermore, the "computer-readable recording medium" represents a portable medium such as a flexible disc, a magneto-optical disk, a ROM, or a CD-ROM or a storage device such as a hard disk built in the computer system. In addition, the "computer-readable recording medium" includes a medium that dynamically maintains a program for a short time such as a communication line of a case in which a program is transmitted through a network such as the Internet or a communication circuit line such a telephone circuit line and a medium that maintains a program for a predetermined time such as a volatile memory of the inside of a computer system serving as a server or a client in such a case. Furthermore, the program described above may be a program used for realizing a part of the function described above or a program to be combined with a program that has already been recorded in the computer system for realizing the function described above.

As above, while the embodiments of the present invention have been described in detail with reference to the drawings, specific configurations are not limited to those of the embodiments, and various design changes and the like may be made in a range not departing from the concept of the present invention.

REFERENCE SIGNS LIST

1 Laser scanning system
11 Laser scanner
12 Coordinate point extracting unit
13 Table rotation mechanism unit
14, 14A Table rotation speed control unit
15 Laser pulse radiation control unit
16 Clustering unit
17, 17A Detection target detecting unit
18, 18A Tracking unit
19 Rotation angle range selecting unit
20 Storage unit
21, 21B Three-dimension restoring unit
22 Target object extracting unit
23, 23B Rotation angle range estimating unit
24 Posture estimating unit
25 Environment matching unit

The invention claimed is:

1. A laser scanning system mounted on a movable body, the system comprising:
   a plurality of laser scanner devices configured to emit a plurality of lasers in a detection space;
   the system configured to rotate the plurality of laser scanner devices around a first rotation axis; and
   the system configured to allow the plurality of laser scanner devices to simultaneously emit the plurality of lasers such that a first plurality of rotation angles at which lasers emitted by a first laser scanner device of the plurality of the laser scanner devices and a second plurality of rotation angles at which lasers emitted by a second laser scanner device of the plurality of the laser scanner devices are not the same rotation angles,
   wherein at least one of the laser scanner devices is configured to rotate a laser emission direction at a second rotation axis rotation speed around a second rotation axis tilted from the first rotation axis.

2. The laser scanning system according to claim 1, further comprising:
   a detection target detecting unit configured to detect a presence of a detection target, to allow the system to control a first rotation speed in accordance with a rotational angle around the first rotation axis with respect to the presence of the detection target in the detection space.

3. The laser scanning system according to claim 2, further comprising:
   a rotation angle range selecting unit configured to define a detection rotation angle range representing a range of a rotation angle around the first rotation axis in which the detection target is detected by the detection target detecting unit and define a non-detection rotation angle range representing a range of the rotation angle around the first rotation axis in which the detection target is not detected.

4. The laser scanning system according to claim 3, further comprising:
   a target object extracting unit configured to extract a range of the rotation angle around the first rotation axis in which the detection target corresponding to an extraction condition set in advance is detected as the detection rotation angle range.

5. The laser scanning system according to claim 4, further comprising:
   a rotation angle range estimating unit configured to estimate the detection rotation angle range representing a range of the rotation angle around the first rotation axis in which the detection target corresponding to the extraction condition is present and a non-detection rotation angle range representing a range of the rotation angle around the first rotation axis in which the detection target is not present, on the basis of a relative position and a relative speed between the detection target and the laser scanning system.

6. The laser scanning system according to claim 2, wherein the detection target is a target object which is moving in position.

7. The laser scanning system according to claim 6, wherein the system is configured to estimate a moving position of the target object and to update a detection rotation angle range at predetermined times.

8. The laser scanning system according to claim 6, further comprising:
   a target object extracting unit configured to extract, as the target object, a moving object which is moving from a group of points corresponding to surrounding objects, obtained by a laser of the plurality of lasers,
   the detection target detecting unit detects the moving object as the target object.

9. The laser scanning system according to claim 1, wherein the plurality of laser scanner devices are mounted on the movable body symmetrically with reference to the first rotation axis.

10. The laser scanning system according to claim 1, wherein the system is configured to control an amount of a rotation angle to be variable to allow the plurality of laser scanner devices to simultaneously emit the plurality of lasers at the first plurality of rotation angles of a first rotation cycle and then simultaneously emit the plurality of lasers at the second plurality of rotation angles of a second rotation cycle next to the first rotation cycle, wherein the second plurality of rotation angles is different from the first plurality of rotation angles.

11. The laser scanning system according to claim 1, wherein a first rotation speed control unit is configured to make a first rotation axis rotation speed in a detection rotation angle range lower than the first rotation axis rotation speed in a non-detection rotation angle range.

12. The laser scanning system according to claim 1, wherein at least one of the laser scanner devices is configured to change, for scanning, a radiation direction of a laser of the plurality of lasers to be emitted toward a predetermined scanning face.

13. The laser scanning system according to claim 1, wherein at least one of the laser scanner devices includes a digital mirror device configured to scan a laser of the plurality of lasers in a radiation direction.

14. The laser scanning system according to claim 1, wherein the second rotation axis is tilted from the first rotation axis by more than 0 degrees and less than 180 degrees.

15. The laser scanning system according to claim 14, wherein the system is configured to change the second rotation axis rotation speed on a basis of a rotation angle with respect to the second rotation axis, wherein the rotation angle is defined by the presence of a detection target in the detection space.

16. The laser scanning system according to claim 14, wherein a two dimensional plane is tilted from the first rotation axis, and the two dimensional plane is defined to include a circle which is drawn by rotation of the laser emission direction around the second rotation axis.

17. The laser scanning system according to claim 1, wherein a first rotation axis rotation speed is equal to or more than 0.1 Hz.

18. The laser scanning system according to claim 1, wherein the system is configured to acquire a group of points in a three-dimensional space in each rotation cycle and estimate a posture and a position of a moving object from the group of points.

19. The laser scanning system according to claim 1, wherein the system is configured to change a first rotation axis rotation speed on a basis of an estimated posture and position of a moving object.

20. A laser scanning method, the method comprising:
emitting, by a plurality of laser scanner devices mounted on a movable body, a plurality of lasers in a detection space; and
rotating emission directions of the plurality of laser scanner devices around a first rotation axis at a first rotation axis rotation speed
to allow the plurality of laser scanner devices to simultaneously emit the plurality of lasers such that a first plurality of rotation angles at which lasers emitted by a first laser scanner device of the plurality of the laser scanner devices and a second plurality of rotation angles at which lasers emitted by a second laser scanner device of the plurality of the laser scanner devices are not the same rotation angles,
wherein a laser emission direction is rotated at a second rotation axis rotation speed around a second rotation axis tilted from the first rotation axis.

21. A non-transitory computer readable storage medium that stores computer readable instructions, when executed by one or more computers, to cause the one or more computers to perform a laser scanning method for a plurality of laser scanner devices mounted on a movable body to emit a plurality of lasers in a detection space, the method comprising:
rotating emission directions of the plurality of laser scanner devices around a first rotation axis at a first rotation axis rotation speed
to allow the plurality of laser scanner devices to simultaneously emit the plurality of lasers such that a first plurality of rotation angles at which lasers emitted by a first laser scanner device of the plurality of laser scanner devices and a second plurality of rotation angles at which lasers emitted by a second laser scanner device of the plurality of laser scanner devices are not the same rotation angles,
wherein a laser emission direction is rotated at a second rotation axis rotation speed around a second rotation axis tilted from the first rotation axis.

* * * * *